(12) United States Patent
Katoh et al.

(10) Patent No.: US 6,514,328 B1
(45) Date of Patent: Feb. 4, 2003

(54) MARKING INK COMPOSITION AND DISPLAY MEDIUM USING THE SAME

(75) Inventors: Ikuo Katoh, Kanagawa (JP); Hitoshi Kondoh, Kanagawa (JP); Kunio Hayakawa, Shizuoka (JP); Mitsunobu Morita, Shizuoka (JP); Kyohji Tsutsui, Shizuoka (JP); Takashi Okada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/497,947

(22) Filed: Feb. 4, 2000

(30) Foreign Application Priority Data

| Feb. 5, 1999 | (JP) | 11-029238 |
| Jun. 30, 1999 | (JP) | 11-184710 |
| Oct. 8, 1999 | (JP) | 11-288276 |
| Feb. 3, 2000 | (JP) | 2000-026043 |

(51) Int. Cl.[7] ............................................. C09D 11/00
(52) U.S. Cl. ............................. 106/31.28; 106/31.25; 106/31.26; 106/31.9; 106/31.64
(58) Field of Search .................. 106/31.28, 31.9, 106/31.64, 31.25, 31.26

(56) References Cited

U.S. PATENT DOCUMENTS 5,389,130 A * 2/1995 Batlaw et al. ............ 106/31.26
5,429,841 A * 7/1995 Batlaw et al. ............... 427/288
5,772,741 A * 6/1998 Spinelli ..................... 106/31.25
5,948,151 A * 9/1999 Ono et al. ................. 106/31.26
6,020,400 A * 2/2000 Anton et al. ................. 523/161
6,165,258 A * 12/2000 Asada ....................... 106/31.26

* cited by examiner

Primary Examiner—Helene Klemanski
Assistant Examiner—Veronica F. Faison
(74) Attorney, Agent, or Firm—Cooper & Dunham LLP

(57) ABSTRACT

A marking ink composition contains a dye, a pigment, a dispersion medium X in which the dye is practically soluble, and a dispersion medium Y in which the dye is practically insoluble, the dispersion media X and Y being mutually immiscible. A display medium includes a marking ink composition, and two plates for holding the marking ink composition therebetween, at least one of the plates having a transparent portion. A method for printing an image on an image receiving material includes the steps of depositing the above-mentioned marking ink composition on the image receiving material, and removing the dispersion medium X and the dispersion medium Y from the image receiving material. There is also described an image printed on an image receiving material by the above-mentioned printing method.

24 Claims, 10 Drawing Sheets

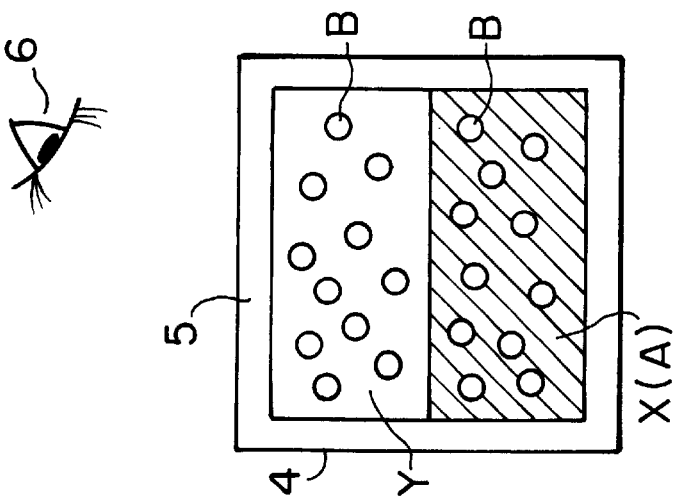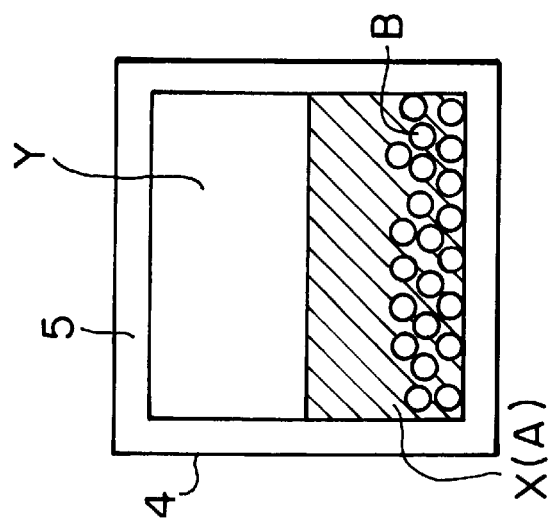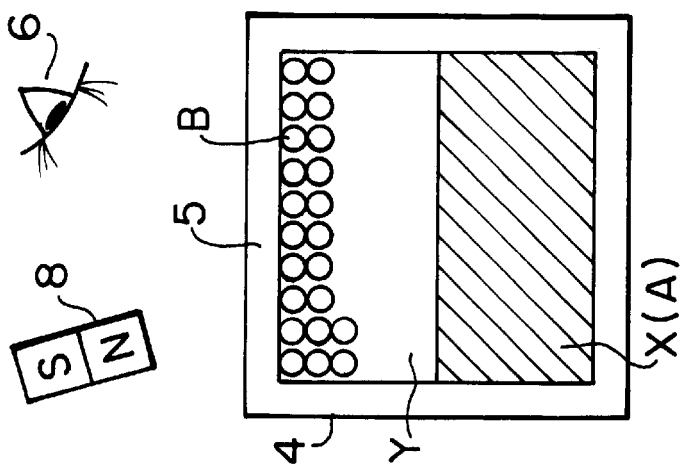

FIG. 2
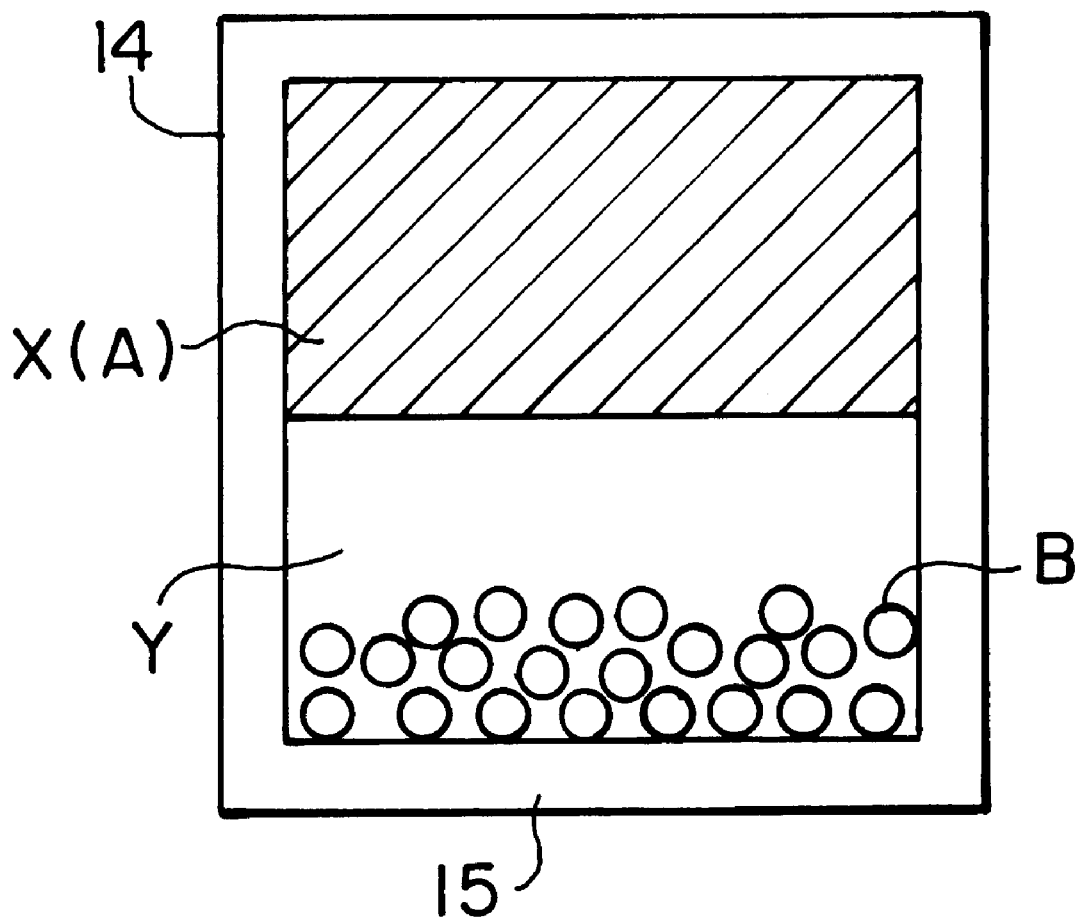

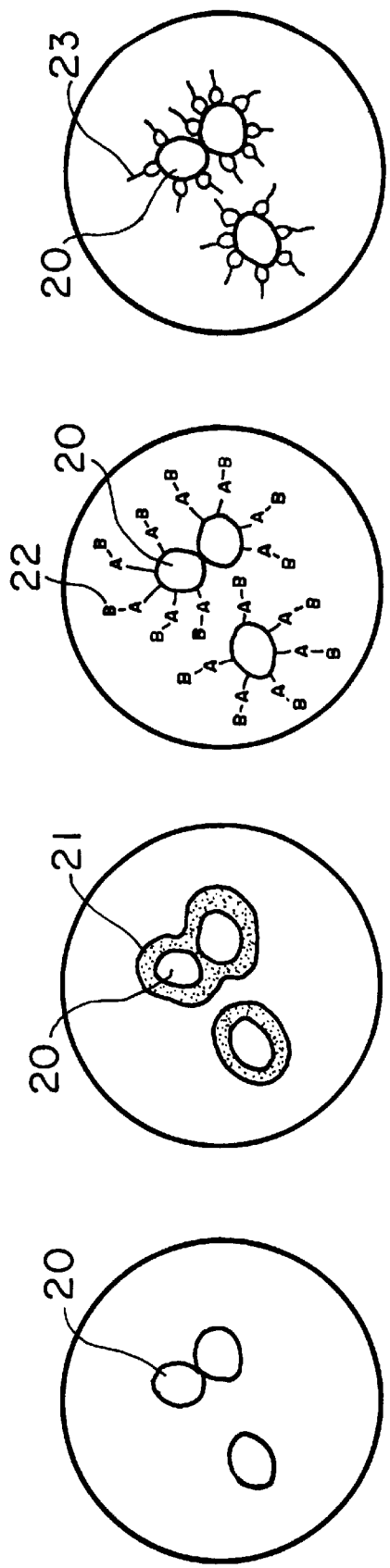

MARKING INK COMPOSITION AND DISPLAY MEDIUM USING THE SAME

BACKGROUND OF THE INVENTION

1. Field of the Invention

The present invention relates to a marking ink composition comprising a dye and a pigment, and a display medium comprising the above-mentioned marking ink composition which is held in an enclosed space. Further, the present invention also relates to a printing method using the above-mentioned marking ink composition, and an image printed on an image receiving material by such a printing method.

2. Discussion of Background

A liquid crystal, electrochromic device, electrophoretic migration device, and magnetic migration device are conventionally known as elements for use in the display medium which can be visually recognized as reversibly changeable by the action of an electric field. Most of such display media employing the above-mentioned elements are constructed in such a manner that the display element is held between a pair of electrodes, with the display medium being connected to a driving circuit capable of applying a signal to each electrode for achieving image display.

The conventional display medium of electrophoretic migration type employs a marking ink composition which comprises a liquid medium, a dye which is dissolved therein, and a pigment powder which is dispersed therein. A marking ink in which two kinds of pigment powders are dispersed is also conventionally used. The display media using such marking ink compositions are described in Japanese Patent Publication 50-1519 and U.S. Pat. No. 3,668,106.

However, it is difficult to use the above-mentioned marking ink composition in which a dye is soluble as a printing ink for forming an image on a sheet of paper. When such a marking ink is applied to a display medium, the contrast and the reflectance are inferior to those of an image formed by an electrophotographic process, as reported in D. W. Vace, Proc. SID, vol.18/3&4, p.267, 1977, and J. Jacobson, Nature, vol.394/16, p.252, 1998. This is because inherent color of the pigment powder is hindered by a dye adsorbed by the surface of the pigment powder and a dye solution existing between the pigment particles, and therefore the color of the pigment is unfavorably mixed with the color of the dye.

On the other hand, when the above-mentioned conventional marking ink composition in which two kinds of pigment powders are dispersed is employed, although the contrast can be easily increased, the response speed is very slow in electrophoretic migration. The reason for this is that the two kinds of pigment powders which are provided with different electric charges are lacking in dispersion stability. Further, there is the drawback that aggregation of the two kinds of pigment powders results in color mixing, thereby decreasing the contrast.

In addition, a display medium using a liquid which comprises polarized particles, which medium is similar to the above-mentioned display medium of electrophoretic migration type, is proposed in Japanese Patent Publication Nos. 54-15217 and 57-25811. However, such a display medium has the problems in long-term stability, response speed, and display uniformity although the contrast is relatively high.

There is also conventionally known a magnetic migration type display medium. The state of the display medium can be reversibly switched by the action of a magnetic field, and such states can be visually recognized. One of the magnetic migration type display media comprises a marking ink composition in which a magnetic powder and a pigment powder serving as a concealing powder are dispersed in a liquid medium. This ink composition is held in an enclosed space. The migration of the magnetic powder in the liquid medium is caused by the application of a magnetic field to the liquid medium using a magnet, so that reversible color display can be achieved. The magnetic migration type display medium, which is described in, for example, Japanese Patent Publication Nos. 51-10959 and 57-27463, is utilized in the fields of toys for children and blackboards.

Similar to the above-mentioned electrophoretic migration type display medium using the two kinds of pigment powders, the display medium of magnetic migration type has the drawback that the two kinds of powders tend to aggregate to produce the problem of color mixing, so that the contrast is easily decreased.

To eliminate the above-mentioned drawback, a display medium using a magnetic fluid instead of the magnetic powder is proposed in Japanese Laid-Open Patent Application No. 51-93827. In this case, however, it is pointed out that the decrease of contrast is inevitable after long-term service because of unstability of the magnetic fluid.

To improve the display medium using the above-mentioned magnetic powder or magnetic fluid, Japanese Laid-Open Patent Application 10-116038 discloses a marking ink composition comprising two different kinds of dispersion media for forming two immiscible liquid phases, and pigment powders with two different colors which are separately dispersed in the respective dispersion media. This ink composition is intended to improve the contrast by completely separating a coloring powder from a concealing powder. Therefore, the pigment powders with different colors are separately dispersed in the respective dispersion media. The aforementioned marking ink composition is characterized in that the two dispersion media are capable of forming two layers which are immiscible, and that each pigment powder shows a strong affinity for the dispersion medium in which the pigment powder is dispersed.

However, there is a problem in this type of display medium. Namely, two different colors are reversibly displayed by using the two kinds of pigment powders, so that there often occurs physical collision between the different kinds of pigment powders while the position of the pigment powders are replaced for switching the color display. Such physical collision causes the two kinds of pigment powders to aggregate, thereby decreasing the response speed. At the same time, the contrast is decreased because of color mixing. In particular, when the two kinds of pigment powders are electrophoretically driven, the characteristics of those pigment powders are caused to deteriorate conspicuously by the collision. Furthermore, the concentration of pigment powder is increased with the progress of the aggregation of the two kinds of pigment powders, thereby increasing the viscosity of the liquid medium as the dispersion. The result is also the decrease in response speed.

SUMMARY OF THE INVENTION

In light of the above-mentioned conventional shortcomings, a first object of the present invention is to provide a marking ink composition capable of reversibly displaying at least two colors with excellent contrast or high degree of whiteness.

A second object of the present invention is to provide a display medium capable of reversibly displaying at least two colors using the above-mentioned marking ink composition.

A third object of the present invention is to provide a printing method using the above-mentioned ink composition.

A fourth object of the present invention is to provide an image printed by the above-mentioned printing method using the ink composition.

The first object of the present invention can be achieved by a marking ink composition comprising a dye, a pigment, a dispersion medium X in which the dye is practically soluble, and a dispersion medium Y in which the dye is practically insoluble, the dispersion medium X and the dispersion medium Y being mutually immiscible.

The second object of the present invention can be achieved by a display medium comprising the above-mentioned marking ink composition, and two plates for holding the marking ink composition therebetween, at least one of the plates comprising a transparent portion.

The third object of the present invention can be achieved by a method for printing an image on an image receiving material, comprising the steps of depositing the above-mentioned marking ink composition on the image receiving material, and removing the dispersion medium X and the dispersion medium Y from the image receiving material.

In the above-mentioned depositing step, the dispersion medium X in which the dye is soluble may be first deposited on the image receiving material to form a first image thereon, the dispersion medium Y in which the pigment is dispersed may be superimposed on the first image.

The fourth object of the present invention can be achieved by an image printed on an image receiving material by the above-mentioned printing method.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1(a), 1(b), and 1(c) are schematic diagrams in explanation of the process for changing the color display of a display medium using a marking ink composition according to the present invention.

FIG. 2 is a schematic diagram in explanation of the color display using a marking ink composition according to the present invention.

FIG. 4(a) is a schematic view showing a pigment powder dispersed in a marking ink composition. FIGS. 4(b), 4(c), and 4(d) are schematic views in explanation of a hydrophobic or non-polar portion on the surface of the pigment powder.

DESCRIPTION OF THE PREFERRED EMBODIMENTS

Figure 3A:
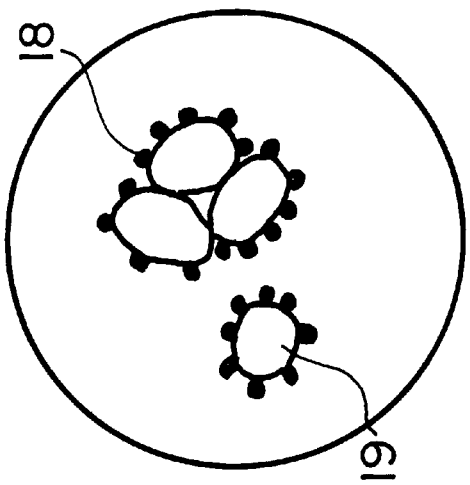
FIGS. 3(a), 3(b), and 3(c) are schematic views in explanation of the influence of a dye or dye solution on a pigment powder dispersed in a marking ink composition.

A marking ink composition of the present invention can reversibly display at least two colors although the composition of the ink is single.

The principle of color display by a display medium which employs a marking ink composition of the present invention will now be explained in more detail with reference to FIG. 1.

FIG. 1 is a schematic cross-sectional view of a display medium employing a marking ink composition according to the present invention. In FIGS. 1A, 1B, and 1C, a dye is dissolved in a dispersion medium X to prepare a dye solution X(A). A shaded area means a dye-soluble area. In a dispersion medium Y, the above-mentioned dye is practically insoluble. The dispersion medium X is separated from the dispersion medium Y to form two layers which are immiscible, with the dispersion medium X constituting a lower layer, and the dispersion medium Y constituting an upper layer. Pigment particles B are dispersed in the two liquid phases. The marking ink composition is held in a sealed container 4 with a transparent window 5 at the top portion of the container 4. The color display can be visually observed through the transparent window 5 by an observer 6. Reference numeral 8 indicates a magnet.

The marketing ink composition shown is prepared by adding a dye and a pigment B to a liquid medium which comprises the dispersion medium X and the dispersion medium Y which are capable of forming two immiscible liquid phase as mentioned above, and dissolving the dye and dispersing the pigment powder B in the liquid medium with stirring and by the application of ultrasonic vibration. When the thus prepared marking ink composition is placed in the container 4, the ink composition assumes such a state as shown in FIG. 1A.

In this case, a mixture consisting of 3 parts by weight of tetrachloroethylene and 7 parts by weight of n-hexane is used as the dispersion medium X; while water is used as the dispersion medium Y. The specific gravity of the oil-based mixture is made larger than that of water. 2.5 ml of the oil-based mixture is mixed with 2.5 ml of water. Further, as a dye for the marking ink composition, a blue anthraquinone oil dye "Macrolex Blue RR" (Trademark), made by Bayer Co., Ltd. is used with a concentration of about 1.0% of the weight of the oil-based mixture. As the pigment powder B, a commercially available black iron powder (made by Wako Pure Chemical Industries, Ltd.) is employed so that the concentration of the pigment powder B is 10 wt % of the liquid medium consisting of the dispersion medium X and the dispersion medium Y.

As previously described, the marking ink composition as shown in FIG. 1 is held in the closed container 4 of which the top portion is provided with the transparent window 5. The state of the marking ink composition can be recognized by visual observation from the transparent window 5 of the container 4.

Immediately after the marking ink is placed in the container 4 and the container 4 is tightly sealed, the state of the ink composition is as illustrated in FIG. 1A. Namely, the blue anthraquinone oil dye is dissolved in the oil-based mixture serving as the dispersion medium X to prepare a dye solution X(A). At the same time, a liquid phase of the dye solution X(A) is separated from a liquid phase of water serving as the dispersion medium Y, with the black iron powder B serving as the pigment powder being dispersed in both the dye solution (X(A) and the dispersion medium Y (water). In such a case, when viewed from above via the window 5, the marking ink composition assumes a blue tinged black color because the black iron powder B is dispersed in water 2 against the blue dye solution X(A).

After 10 minutes or more, the marking ink composition assumes such a state as illustrated in FIG. 1B. The black iron powder B has settled down to the bottom of the container 4. In this case, the black iron powder B at the bottom of the container 4 is concealed from the blue dye solution, so that only the blue color of the dye is recognized when viewed via the window 5.

While the marking ink composition is in such a state as illustrated in FIG. 1B, a strong magnet 8 is brought in contact with the outer surface of the sidewall of the container 4, and thereafter, released therefrom, and disposed above the window 5, as shown in FIG. 1C. In this case, the black iron powder B is attached to the inner surface of the window 5, so that the black color of the iron powder 4 is recognized at the position of the observer 6. The blue color is scarcely found by the observer 6. It is considered that faint recognition of the blue color is attributed to the blue dye solution slightly attached to the black iron powder B, or the blue dye physically adsorbed by the iron powder B.

After that, the magnet 8 is again brought into contact with the outer surface of the sidewall of the container 4, and released therefrom. Then, the magnet 8 is disposed apart from the container 4 on the side of the bottom of the container 4. In this case, the black iron powder B is attached to the bottom of the container 4, so that the state of the marking ink composition is substantially the same as that in FIG. 1B. The black iron powder B is concealed from the blue dye solution X(A), and only the blue color of the dye is recognized when viewed via the window 5.

The dye and the pigment powder are separated from each other in the states of FIG. 1B and FIG. 1C owing to the dispersion medium X and the dispersion medium Y which form two immiscible liquid phases. Therefore, the color mixing of the pigment powder B with the dye can be drastically reduced when the hiding power of the pigment powder is sufficiently high. As a result, color display performance can be remarkably improved.

In contrast to the marking ink composition of the present invention as shown in FIG. 1, a conventional marking ink composition is illustrated in FIG. 11. The principle of color display using the conventional marking ink composition will now be described with reference to FIG. 11.

Figure 11C:
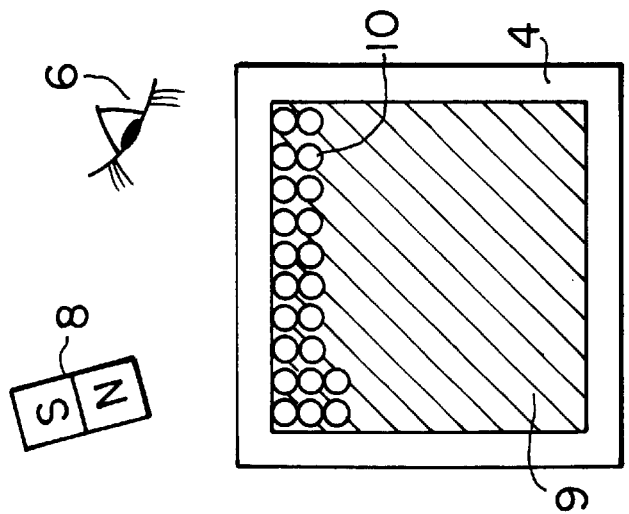
FIGS. 11(a), 11(b), and 11(c) are schematic diagrams in explanation of the process for changing the color display using a conventional marking ink composition.
Figure 11B:
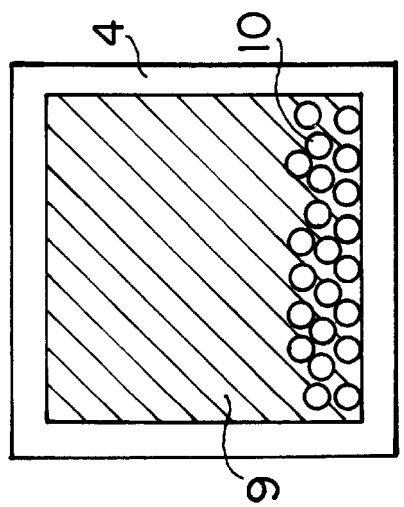
Figure 11A:
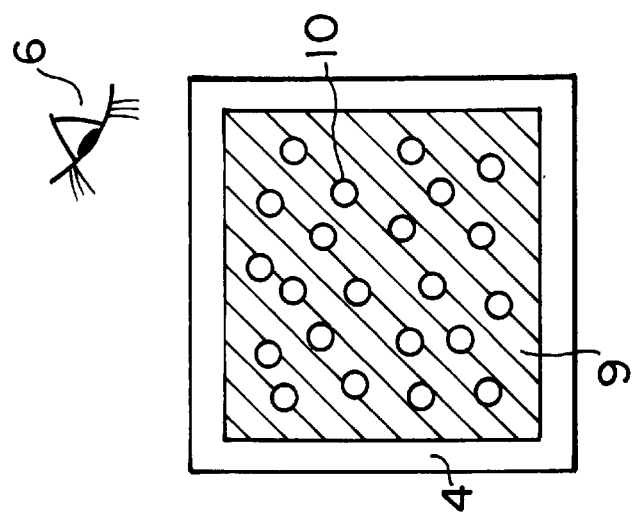

In FIGS. 11A, 11B, and 11C, reference numeral 9 indicates a liquid medium capable of dissolving a dye therein and dispersing a pigment powder 10 therein. A shaded area means a dye-soluble area.

A dispersion medium of FIG. 11A is prepared in such a manner that a dye and a pigment are added to the liquid medium 9, and the dye is dissolved and the pigment is dispersed in the liquid medium 9 with stirring and by the application of ultrasonic vibration, thereby obtaining a marking ink composition. Then, the thus obtained marking ink composition is placed in a container 4. In this case, there is used as the liquid medium 9 the same oil-based mixture in an amount of about 5 ml as employed as the dispersion medium X in FIG. 1. The blue anthraquinone oil dye is used with a concentration of about 0.5 wt %, and the black iron powder is used with the concentration of 5 wt % as the pigment powder 10. The marking ink composition is held in a closed container 4, of which the top portion is made transparent. The state of the ink composition is visually recognized through the transparent top portion.

Immediately after the marking ink composition is placed in the container 4 and the container 4 is tightly sealed, the state of the ink composition is such that the black iron powder 10 is dispersed throughout in the liquid medium 9 as illustrated in FIG. 11A. In this state, the ink composition is recognized as a black tinged blue color due to the dispersed black iron powder 10 and the blue dye solution.

After 10 minutes or more, the marking ink composition assumes such a state as illustrated in FIG. 11B. The black iron powder 110 has settled to the bottom of the container 4. At that time, the black color of the iron powder 10 is concealed from the blue dye color, so that only the blue color is recognized when viewed through the top portion of the container 4.

While the marking ink composition is in such a state as illustrated in FIG. 11B, a strong magnet 8 is brought in contact with the outer surface of the sidewall of the container 4, and thereafter, released therefrom, and disposed above the container 4, as shown in FIG. 11C. In this case, the black iron powder 10 is attached to the inner surface of the top portion of the container 4. When viewed from above, the marking ink composition assumes a black color considerably tinged with blue. This is because the black iron powder 10 is affected by the blue dye.

After that, the magnet 8 is again brought into contact with the outer surface of the sidewall of the container 4, and released therefrom. Then, the magnet 8 is disposed apart from the container 4 on the side of the bottom of the container 4. In this case, the black iron powder 10 is attached to the bottom of the container 4. Namely, the state of the ink composition is substantially the same as that in FIG. 11B. At the time, the black iron powder 10 is again concealed from the blue dye solution, and the blue color of the dye is recognized when viewed from above.

In the state of FIG. 11C, a large amount of blue dye solution intervenes in the gap of particles of the black iron powder 10, and the blue dye is physically absorbed by the surface of the black iron powder 10. Therefore, it is difficult for the ink composition to assume a pure black color peculiar to the black iron powder 10. To reduce the color mixing effect by the dye, the concentration of the dye may be decreased to reduce the amount of dye which is likely to exist in the gap between the particles of iron powder. However, it is required to increase the thickness of a layer comprising the iron powder 10 to 100 μm or more in the state of FIG. 11C in accordance with Lambert-Beer's law, as shown in D. W. Vace, Proc. SID, vol. 18/3&4, p.267, 1977, when the concentration of dye is decreased with the dyeing properties of dye being maintained. The increase in thickness of the iron powder 10 makes it difficult to obtain a thin and light display medium capable of achieving color display with high resolution and at high response speed.

However, in the present invention, the color of the pigment powder is obtained under such a condition that the pigment powder is present in the dispersion medium Y in which the dye is practically insoluble. Therefore, the conventional problem of color mixing of the pigment powder with the dye can be solved. Further, different pigment powders capable of producing different colors are not employed in the present invention, so that it is possible to eliminate the problems of collision and aggregation of pigment powders. The result is that the color mixing can be eliminated, and the decrease of response speed can be prevented.

The dispersion media X and Y which are mutually immiscible to form two liquid phases may be determined depending upon the kind of dye to be employed. There are various combinations, for example, combination of a polar solvent and a non-polar solvent, combination of different kinds of polar solvents, or combinations of different kinds of non-polar solvents.

Each of the dispersion medium X or B may consist of a single dispersion medium, or a mixture of dispersion media. The dispersion medium X and the dispersion medium Y may be selected so that they are mutually immiscible to cause the phase separation in the ink composition.

The combination of the dispersion media X and Y capable of forming two immiscible liquid phases is such that the dispersion media X and Y exhibit low compatibilities with each other, and that the dispersion media X and Y produce at least an immiscible portion without fail when mixed at a predetermined amount ratio at room temperature. For instance, when water and benzene are mixed so that the concentration of water is 50 ppm, water substantially dissolves in benzene. Such a combination is not regarded as the combination capable of forming two immiscible liquid phases. However, when water is mixed with benzene so that the amount ratio of water is 1 wt % benzene, a part of water remains insoluble in benzene and separates from benzene, thereby forming two immiscible liquid phases.

The dispersion medium X and/or dispersion medium Y may be a polar solvent. Any polar solvents are usable as long as they have a polar group and assume a liquid state at room temperature. Examples of the polar group include hydroxyl group, ether group, halogen group, ketone group, ester group, carbonate group, carboxylic acid group, nitro group, amino group, sulfone group, phosphonic acid group, sulfonic acid group, and amide group.

Examples of the polar solvent having hydroxyl group include methyl alcohol, ethyl alcohol, isopropyl, alcohol, ethylene glycol, diethylene glycol, and glycerin.

Examples of the polar solvent having ether group include diethyl ether, dibutyl ether, dimethoxyethane, diethoxyethane, tetrahydrofuran, and 1,3-dioxoran.

Examples of the polar solvent having carbonate group include dimethyl carbonate, methyl ethyl carbonate, and propylene carbonate.

A solvent having a halogen group, in particular, a fluorine group as a substituent is selected with utmost care because the polarity of the solvent is not always maintained after the substitution. The polarity may be changed depending upon the position of the substituent and the number of substituents. Namely, some polar solvents, subjected to fluorine-substitution, may exhibit non-polar behavior.

In addition to the examples, γ-butyrolactam, acetonitrile, dimethylformamide, dimethylsulfoxide, hexamethylphosphoamide, and nitromethane are usable as the polar solvents.

The dispersion medium X and/or dispersion medium Y may be a non-polar solvent. Any non-polar solvents are usable as long as they assume a liquid state at room temperature.

Examples of the non-polar solvent are paraffin hydrocarbons such as n-hexane, octane, dodecane, kerosine, "Isoper" (Trademark, made by Exxon Chemical Japan Ltd.), and cyclohexane; olefin hydrocarbons such as hexane and dodecane; and aromatic hydrocarbons such as benzene, toluene, xylene, and ethylbenzene. Further, there can be employed alcohols, ketones, esters, and glycerides such as colza oil and soybean oil, each having a long-chain alkyl group or alklenyl group having 12 to 22 carbon atoms.

Examples of the non-polar solvent having a fluorine group include completely fluorinated compounds such as perfluoro-n-octane, perfluorocyclohexane, perfluorobenzene, and perfluorotributylamine; and partially fluorinated compounds such as 2H-perfluoro-5,8-dimethyl-3,6,9-trioxadecane, and dichlorobenzotrifluoride.

To be more specific, there can be employed the following combinations of dispersion media X and Y; water and tetrachloroethylene; water and trichloroethylene; water and hexane; water and "Isoper"; water and xylene; water and perfluorooctane; acetone and a commercially available fluorinated hydrocarbon "FC40" (Trademark), made by Sumitomo 3M Limited; water and a commercially available fluorinated ether "HFE7200" (Trademark), made by Sumitomo 3M Limited; water and tricresyl phosphate; tetrachloroethylene and perfluorooctane; tetrachloroethylene and the fluorinated ether "HFE7200"; and xylene and the fluorinated hydrocarbon "FC40". Further, for a water-soluble dye, there can be employed water as the dispersion medium X, and a mixture of xylene and the fluorinated ether "HFE7200" as the dispersion medium Y; and for an oil dye, there can be employed water as the dispersion medium Y, and a mixture of xylene and the fluorinated ether "HFE7200" as the dispersion medium X. In addition, for a water-soluble dye, there can be employed water as the dispersion medium X, and a mixture of hexane, the fluorinated hydrocarbon "FC40", and the fluorinated ether "HFE7200" as the dispersion medium Y. For an oil dye, there can be employed a mixture of xylene and the fluorinated ether "HFE7200" as the dispersion medium X, and the fluorinated hydrocarbon "FC40" as the dispersion medium Y. Further, for an oil dye, there can be employed a mixture of toluene and the fluorinated ether "HFE7200" as the dispersion medium X, and the fluorinated hydrocarbon "FC40" as the dispersion medium Y.

The marking ink composition of the present invention may further comprise a dispersion medium Z so as to obtain three immiscible liquid phases. In this case, a dye and a pigment are dissolved and dispersed in the liquid medium comprising the dispersion medium X, Y, and Z. The dispersion medium Z may be a single solvent or a mixed solvent so long as the dispersion media X, Y, and Z are immiscible.

Examples of the combination of the dispersion media X, Y, and Z for use in the present invention are as follows:

hexane, xylene, and water, xylene, water, and the fluorinated hydrocarbon "FC40", hexane, water, and the fluorinated ether "HFE7200", and water, tetrachloroethylene, and the fluorinated hydrocarbon "FC40".

As previously mentioned, the dispersion medium X and the dispersion medium Y are mutually immiscible. It means that two layers (which will also be hereinafter referred to as an upper layer and a lower layer) are formed when the dispersion medium X and the dispersion medium Y are stirred, and thereafter allowed to stand. When the marking ink composition comprises dispersion media X, Y, and Z, which are mutually immiscible, three layers (which will also be hereinafter referred to as a top layer, an intermediate layer, and the bottom layer) are formed when the three dispersion media X, Y, and Z are stirred, and thereafter allowed to stand.

The density (specific gravity) of each dispersion medium for use in the marking ink composition is appropriately determined according to the function of the dispersion medium. In the case where the color of the marking ink composition is observed through the top portion of the container as illustrated in FIG. 1, it is preferable to determine the densities of the dispersion medium X and the dispersion medium Y so that the dispersion medium X in which a dye is soluble constitutes a lower layer and the dispersion medium Y in which the dye is practically insoluble constitutes an upper layer. In this case, the relationship among the density $d^1$ of a dispersion medium X, the density $d^2$ of a dispersion medium Y, and the density $d^3$ of a dye solution obtained by dissolving a dye in the dispersion medium X is expressed by the following formulas:

$$d^1 \geq d^2$$

$$d^3 \geq d^2$$

It is preferable that the ratio of $d^1/d^2$ be in the range of 1.0 to 5.0, and more preferably in the range of 1.0 to 2.0.

When the ratio of $d^1/d^2$ is too large, the display surface of a display medium may be limited to the top surface. The degree of freedom in the display surface and the observation direction of the display medium can be somewhat controlled by the volume ratio of a solid content in the dispersion which varies depending on the concentration of a pigment powder. However, it is preferable that the ratio of $d^1/d^2$ be around 1.0 to obtain such a degree of freedom in the display surface and the observation direction as that of a sheet of paper. To obtain optimum densities, it is important that the densities of the dispersion media X and Y be considered in light of the weight of a dye and a pigment powder under the condition that two immiscible liquid phases are formed. Further, in the case where the volume ratio of a solid content of the pigment powder to the dispersion medium Y is 0.15 or more, the viscosity of the obtained dispersion tends to increase, and at the same time, the dispersion medium Y tends to move together with the pigment powder. In such a case, the pigment powder can be fixed to a part of the dispersion medium Y owing to the adhesion of the pigment powder to the enclosed space regardless of the display surface even when the ratio of $d^1/d^2$ is 2.0 or more.

On the other hand, when the display medium is viewed from the bottom side thereof, the densities of the dispersion medium X and the dispersion medium Y may be determined so that the liquid phase of the dispersion medium X in which a dye is soluble is situated on the liquid phase of the dispersion medium Y in which the dye is practically insoluble. In this case, it is preferable that the relationship among the density $d^1$ of a dispersion medium X, the density $d^2$ of a dispersion medium Y, and the density $d^3$ of a dye solution obtained by dissolving a dye in the dispersion medium X be expressed by the following formulas:

$$d^1 \geq d^2$$

$$d^3 \geq d^2$$

It is preferable that the ratio of $d^2/d^1$ be in the range of 1.0 to 5.0, and more preferably in the range of 1.0 to 2.0. The closer to the $d^2/d^1$ ratio of 1.0, the more preferable in terms of the above-mentioned degree of freedom.

When the dispersion media X, Y, and Z are employed, the density of the dispersion medium Z may be determined so that the dispersion medium Z constitutes (i) the intermediate layer, (ii) the top layer, or (iii) the bottom layer.

According to the application of display medium, it is desirable to select each dispersion medium in term of not only the density (specific gravity), but also other properties, such as velocity, dielectric constant, resistivity, refractive index, distribution of transmittance, and solubility of dye. It is preferable that the above-mentioned physical properties of the dispersion media to be employed be substantially the same. To facilitate the control of the above-mentioned physical properties of those dispersion media, an appropriate solvent may be selected for each dispersion medium, or a plurality of solvents may be used in combination therefor.

In addition, it is preferable to appropriately choose the dispersion media in terms of the hydrophilic nature, hydrophobic nature, lipophilic nature, polarity, and surface tension.

When the dispersion media X and Y form two immiscible liquid phases, the ratio by volume of one liquid phase to the other liquid phase may not necessarily be the same. It is preferable that the volume of the dispersion medium X be larger than the volume of the dispersion medium Y. To be more specific, it is preferable that the volume of the dispersion medium X be two times or more, more preferably, ten times or more the volume of the dispersion medium Y. Ideally, the volume of the dispersion medium Y may be determined so as to compensate the space of the container without any gap when the pigment powder layer is formed. It is proper that the volume ratio of the dispersion medium X to the dispersion medium Y be in the range of 0.50 to 20, preferably in the range of 2.0 to 20.

The dye for use in the present invention will now be explained in detail.

Any of a water-soluble dye or an oil dye is usable as the dye for use in the marking ink composition. The dye may be determined according to the combination of the above-mentioned dispersion media X and Y capable of forming two immiscible liquid phases. At the same time, the dye may be selected in light of the difference in coloring performance of the pigment powder to be employed together with the dye. Generally, it is preferable to increase the contrast of coloring performance between the dye and the pigment powder, and to increase the difference in the value of $\Delta L^* a^* b^*$ therebetween.

Furthermore, it is effective to add a second dye which is preferentially dissolved in the dispersion medium Y in which the solubility of the above-mentioned first dye is smaller than that in the dispersion medium X. The second dye can produce a mixed color together with the pigment powder.

When an oil dye is employed, it is preferable to employ a hydrophobic, lipophilic, or non-polar solvent as the dispersion medium X. On the other hand, when a water-soluble dye is employed, a hydrophilic, oleophobic, or polar solvent may be used as the dispersion medium X.

However, the combination of the dye and the dispersion medium X is not limited to the above. This is because there are some oil dyes that show a larger solubility in a polar solvent such as a ketone or alcohol than in a non-polar solvent.

As the dye for use in the present invention, there can be employed an azo dye, anthraquinone dye, indigoid dye, phthalocyanine dye, and carbonium dye. In addition to the direct dyes, acid dyes and basic dyes are usable. Those dyes may be used in combination.

As the specific examples of the water-soluble dyes, there are commercially available products "Direct Blue 86", "Direct Blue 106", "Direct Blue 108", "Direct Blue 119", "Direct Blue 203", and "Direct Red 226" (Trademarks made by Nippon Kayaku Co., Ltd.), which are designed for general purpose. In addition, there can be employed dyes for ink jet printing, for example, commercially available products, "IJ Red 207H" and "IJ Yellow 307H" (both made by Daiwa Chemical Industries Co., Ltd.); foodstuff colorants such as food coal-tar color Blue No. 1 and Red No. 2; and a large number of water-soluble dyes for paper, leather, and fibers.

Specific examples of the oil dyes are "Macrolex Blue RR", "Sudan Blue II" (both made by BASF Japan Ltd.), "Oil Yellow SS special" and "Oil Red RR extra" (both made by Hakudo Co., Ltd.), "Diaresin Green A" and "Diaresin Blue G", "Diaresin Blue C", "Diaresin Blue K", and "Diaresin Blue N" (all made by Mitsubishi Chemical Corporation), and "Sumisol Black AR sol" (made by Sumitomo Chemical Co., Ltd.)

The oil dyes for use in the present invention are not limited to the above-mentioned examples.

Preferable examples of the combination of the dispersion medium X, the dispersion medium Y, and the dye are as follows:
water, tetrachloroethylene, and "Macrolex Blue RR",
water, xylene, and "Macrolex Blue RR",
water, perfluorooctane, and "Direct Blue 119",
acetone, the fluorinated hydrocarbon "FC40" (Trademark), made by Sumitomo 3M Limited, and "Direct Blue 119",
acetone, the fluorinated hydrocarbon "FC40", and "Macrolex Blue RR",
water, tricresyl phosphate, and "Macrolex Blue RR",
water, tricresyl phosphate, and "Direct Blue 119", and
water, hexane, the fluorinated hydrocarbon "FC40", the fluorinated ether "HFE7200" (Trademark), made by Sumitomo 3M Limited, and "Macrolex Blue RR".

The combination is not limited to the above.

In the present invention, almost all colors of pigment powders can be used in light of the combination with the dye. In particular, a black color pigment powder is preferably employed in the present invention. The pigment powders may be used in combination.

It is preferable that the pigment powder have a particle diameter of 0.05 to 15 $\mu$m, and more preferably 0.1 to 0.5 $\mu$m when the hiding power of the pigment powder is taken into consideration. The optimal particle size of the pigment powder can be determined in light of the required resolution, hiding power, and response speed.

Specific examples of the pigment powder for use in the present invention are zinc oxide, titanium oxide, carbon black, ivory-black, aniline black, synthetic loess, Benzidine Yellow, red oxide, Carmine 6B, Phthalocyanine Blue, Viridian Green, Phthalocyanine Green, iron powder, magnetite, magnetic fluid, polyethylene, polypropylene, Teflon, poly (methyl methacrylate), and poly(vinylidene fluoride). These pigment powder may be used in combination.

The surface of the above-mentioned pigment powder may be coated with a layer for coloring modification.

The shape of the pigment powder is not particularly limited. However, spherical particles are preferable to needle-like particles and rectangular parallelepiped-shaped particles in order to facilitate uniform migration of numerous particles of the pigment with a viscosity resistance in the fluid.

Specific examples of the combination of a dispersion medium X, a dispersion medium Y, a dye, and a pigment powder are as follows:
tetrachloroethylene, water, "Macrolex Blue RR", and titanium oxide,
tetrachlorolethylene, water, "Macrolex Blue RR", and polyethylene,
xylene, water, "Macrolex Blue RR", and titanium oxide,
tetrachloroethylene, water, "Macrolex Blue RR", and iron powder,
xylene, water, "Macrolex Blue RR", and polyethylene,
xylene, water, "Macrolex Blue RR", and titanium oxide,
"FC40", "Isopar H", "Macrolex Blue RR", and fluorinated titanium oxide, and
"FC40", "Isopar H", "Macrolex Blue RR", and Teflon powder (Trademark "7A-J", made by Du Pont-Mitsui Fluorochemicals Co., Ltd.)

The combination is not limited to the above in the present invention, and a lot of combinations are usable.

In the marking ink composition of the present invention, the dye is practically insoluble in the dispersion medium Y. It is preferable that the solubility of the dye in the dispersion medium Y be 0.1 wt % or less, more preferably 0.01 wt % or less. By employing the dispersion medium Y in which the dye is practically insoluble, the color mixing of the pigment powder with the dye can be minimized.

The term "solubility" of dye in dispersion medium herein used means a ratio by weight of a dye to a dispersion medium Y at the saturation point. When the solubility of the dye in the dispersion medium Y can be controlled to 0.1 wt % or less even though a solvent with a large density and a dye with a large absorption coefficient are used in combination, the reflectance obtained from, for example, a white color attributable to titanium oxide can be made equal to that from a white plain paper. Therefore, it is possible to achieve satisfactory white color display.

It is preferable that the solubility of dye in the dispersion medium X be 0.3 wt % or more, more preferably 0.6 wt % or more. The upper limit of the solubility of dye in the dispersion medium X is about 20 wt %.

In practice, an oil-soluble solvent in which the dye of "Macrolex Blue RR" is dissolved at a concentration of 0.1 wt % exhibits the absorbance of about 27.2 with respect to D65, when measured in the form of a sample cell with a thickness of 10 mm. In the case where "Macrolex Violet 3R" is employed as the dye, the absorbance is 52.9, and in the case where "Merck Oil Red" is employed as the dye, the absorbance is 62.0.

The maximum thickness of the display medium is set at 84.7 $\mu$m to obtain a resolution of 300 dpi. In a display medium, it is supposed that the two immiscible liquid phases be formed at a ratio by volume of 1:1, and one liquid phase of the dispersion medium X has a thickness of 42 μm, and the pigment powder layer with a thickness of 4.2 μm is formed on the top of the other liquid phase of the dispersion medium Y. The absorbance of the pigment layer is 0.011. Even if the dye solution with a dye concentration of 0.1 wt % is present not only at the gap between the pigment particles, but also throughout the pigment layer, the color mixing of pigment powder with dye is acceptable for practical use.

In practice, the effect on light absorption by the dispersion medium Y was visually observed using titanium oxide with a predetermined weight as the pigment powder and "Macrolex Blue RR" as the dye. When the concentration of dye is 0.1 wt % or less, it has been confirmed that the color of the pigment powder can be drastically prevented from being contaminated with a color of the dye. The similar results were obtained when Macrolex Violet 3R and Merck Oil Red, each having a relatively large absorbance, were separately replaced by the Macrolex Blue RR.

When the thickness of the display medium is decreased so as to increase the resolution, it is a matter of course that the effect on color mixing by the presence of dye in the gap between the pigment particles can be reduced. However, the dye physically adsorbed by the surface of the pigment particles affects the color mixing while in use, so that it is preferable to control the concentration of the dye in the dispersion medium Y to 0.1 wt % or less. When the concentration of the dye in the dispersion medium Y is 0.01 wt % or less, excellent color display by the pigment powder can be observed because of drastic reduction of physical adsorption of dye.

In contrast to this, when the concentration of dye in the dispersion medium Y was set to 0.2 wt % or more, it was confirmed that visual recognition of the display medium was hindered by the color mixing of pigment powder with dye.

When the concentration of dye in the dispersion medium is 0.3 wt % or more, the absorbance of 0.792, that is, the optical density of 0.792 can be obtained even though the reflectance from the power layer is 100% since the effective thickness of the upper layer is 37.8 μm (42−4.2). Thus, sufficient coloring properties of the marking ink can be obtained. In practice, sufficient coloring performance was visually recognized at a dye concentration of 0.3 wt % or more; while the coloring performance was insufficient at a dye concentration of 0.2 wt % or less.

It is preferable that the concentration of dye in the dispersion medium X be high to a certain extent. It was experimentally confirmed that the concentration of 0.6 wt % or more is particularly preferable. This concentration corresponds to the optical density of 1.5 or more, which is considered to be sufficient for visual recognition. To increase the resolution of the display medium to 600 dpi, it is required that sufficient coloring performance be exhibited even though the thickness of the display medium is reduced by half. In light of this point, the concentration of dye in the dispersion medium X is preferably 0.6 wt % or more.

In the marking ink composition according to the present invention, it is preferable that the affinity of the dispersion medium X for a pigment to be employed be smaller than the affinity of the dispersion medium Y for the pigment. In this case, the dispersion medium X can be effectively prevented from being adsorbed by the surface of the pigment powder. The result is that the color mixing of the pigment powder and the dye can be reduced.

The second embodiment of the ink display medium according to the present invention will now be explained with reference to FIG. 2. FIG. 2 is a schematic cross-sectional view of a display medium using a making ink composition according to the present invention. In FIG. 2, the marking ink composition comprises two liquid phases, one of the liquid phases comprising a dye solution X(A) prepared by dissolving an oil dye "Macrolex Blue RR" in a non-polar mixed solvent of hexane and tetrachloroethylene. A shaded area indicates a portion in which the dye is soluble. The other liquid phase comprises water Y in which the solubility of the above-mentioned oil-soluble dye is remarkably low. The marking ink composition is composed of the dye solution X(A), water Y, and a titanium oxide powder B serving as a pigment powder. Reference numeral 14 indicates a sealed container. The state of this marking ink composition is visually observed by an observer 16 through a transparent window 15 provided at the bottom of the container 14.

In the marking ink composition shown in FIG. 2, the surface of the titanium oxide powder B exhibits a polarity due to the presence of oxygen atom or hydroxyl group of the oxide. A non-polar mixed solvent of hexane and tetrachloroethylene is used as the dispersion medium X in which the oil dye is preferentially dissolved; while a polar solvent of water is used as the dispersion medium Y in which the solubility of the oil dye is low. In this embodiment of FIG. 2, the affinity of the dispersion medium X for the pigment powder (titanium oxide) is smaller than the affinity of the dispersion medium Y for the pigment powder.

The affinity of the dispersion medium X or Y for the pigment powder is measured by the following method.

100 ml of a dispersion medium X, 100 ml of a dispersion medium Y, and 5 g of a pigment powder which has been sufficiently pulverized to have a primary particle diameter with an average particle size of 1 μm, preferably 0.4 μm are placed in a 500-ml beaker. The mixture thus prepared is stirred for 10 minutes using a stirrer, and thereafter allowed to stand for 30 minutes. 30 minutes later, the dispersion medium X and the dispersion medium Y form two immiscible liquid phases, and it is visually observed whether the pigment powder is mainly present in the liquid phase of the dispersion medium X or the liquid phase of the dispersion medium Y.

When more pigment particles are found in the liquid phase of the dispersion medium X, the affinity of the dispersion medium X for the pigment powder is considered to be larger than the affinity of the dispersion medium Y for the pigment powder. On the other hand, when the amount of pigment powder is more in the liquid phase of the dispersion medium Y, the affinity of the dispersion medium Y for the pigment powder is greater than the affinity of the dispersion medium X for the pigment powder.

Such a measuring method is based on the principle that the finely pulverized pigment particles are influenced by the affinities of the dispersion media therefor to be separated rather than influenced by the difference in density between the pigment powder and the dispersion medium to settle down.

In FIG. 2, the marking ink composition is held in the closed container 14 of which the bottom portion is provided with a transparent window 15. The state of the ink composition is visually observed through the bottom window 15, as mentioned above. Immediately after the ink composition is held in the container 14 and the container 14 is sealed, the dye solution X(A) is promptly separated from the dispersion medium Y, with the titanium oxide powder B being dispersed in the dispersion medium Y. After 30 minutes or more, the titanium oxide powder 13 settles down to the bottom of the container 14, as illustrated in FIG. 2, because the specific gravity of the titanium oxide powder B is larger than that of the dispersion medium Y. In this case, the display medium is recognized as a white color attributable to the titanium oxide powder when viewed through the bottom window 15 by an observer 16. At that time, a blue color of the employed dye is hardly recognized. This is because the amount of the dye solution X(A) adhering to the titanium oxide powder B is remarkably small.

The affinity of a dye for a dispersion medium X or Y, and the affinity of a pigment powder for a dispersion medium X or Y can be controlled by utilizing the difference in hydrophobic nature, hydrophilic nature, lipophilic nature, and water repellent properties. In addition, from the quantitative viewpoint, such an affinity can be adjusted by making their properties such as surface tension, solubility parameter, intensity of hydrogen bonding, vander Waals force, and enthalpy different. Therefore, the combination of a dye, pigment powder, and dispersion media is not limited to the above-mentioned examples. Not only a simple combination of the hydrophobic nature and the hydrophilic nature, but also various complicated combinations are available. For instance, the use of a fluorinated compound having both the hydrophobic nature and the oil repellent properties, or a long-chain alkyl group containing acrylic polymer provided with both a polar group and a non-polar group is effective in obtaining such a complicated combination.

The present invention will now be explained with reference to FIG. 3. In FIGS. 3A to 3C, a pigment powder 19 is dispersed in a marking ink composition.

Figure 3B:
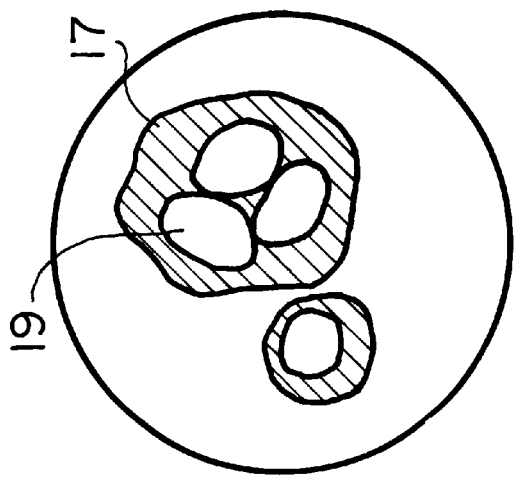

In FIG. 3B, the affinity of the dispersion medium X for the pigment powder 19 is the same as the affinity of the dispersion medium Y for the pigment powder 19. The pigment powder 19 is now dispersed in the dispersion medium Y.

Because of the same affinity as mentioned above, a dye solution X(A) tends to slightly adhere to the surface of the pigment powder 19. Thus, a coating layer 17 comprising the dye solution X(A) is formed on the surface of the pigment powder 19 as shown in FIG. 3B. At that time, color mixing of the pigment with the dye will occur due to the dye dissolved in the dye solution.

Formation of such a coating layer 17 can be effectively prevented by making the affinity of the dispersion medium X for the pigment powder 19 smaller than the affinity of the dispersion medium Y for the pigment powder 19.

Figure 3C:
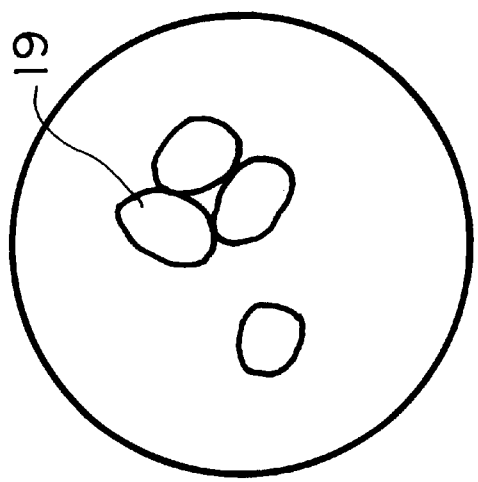

However, when the pigment powder has a polar moiety or hydrophilic moiety on the surface thereof, just like titanium oxide, fine particles of dye 18 are adsorbed by a molecule of the pigment powder 19 as shown in FIG. 3C, even though the dye is an oil dye. In this case, slight color mixing attributable to adsorption of the dye by the surface of pigment powder is inevitable.

In the marking ink composition according to the present invention, it is preferable that the pigment powder comprise a surface portion which comprises a hydrophobic moiety or non-polar moiety. In such a case, it is possible to reduce the adhesion of the dye or the non-polar dispersion medium X in which the dye is dissolved to the surface of the pigment powder, so as to minimize the color mixing of the dye and the pigment powder.

In FIG. 3A, there is employed a polyethylene powder ("PE" 1.707422.0100, Charge/Lot L150522747, made by Merck & Co., Inc.), which has an average particle size of 1 $\mu$m or less according to optical microscopic observation, as the pigment powder 19. One of the dispersion media forming two immiscible liquid phases is water (dispersion medium X), in which a water-soluble dye "Direct Blue 119" is preferentially dissolved, thereby preparing a dye solution X(A). The other is a non-polar mixture of hexane and tetrachloroethylene (dispersion medium Y) in which the solubility of the above-mentioned water-soluble dye is remarkably low. The specific gravity of the pigment powder is almost the same as that of the non-polar dispersion medium Y.

The polyethylene powder 19 comprises a non-polar and hydrophobic surface portion due to methylene group. The dispersion medium X, that is, water is a polar solvent, and the dispersion medium Y, that is, a mixture of hexane and tetrachloroethylene is non-polar. In this embodiment, the affinity of the dispersion medium X for the polyethylene powder 19 is smaller than the affinity of the dispersion medium Y for the polyethylene powder 19.

The above-mentioned marking ink composition is held in a sealed container of which the top portion is transparent, and the state of the marking ink composition is visually observed through the top portion. Immediately after the ink composition is placed in the container and the container is sealed, the dye solution X(A) is separated from the dispersion medium Y (the mixture of hexane and tetrachloroethylene) to form a lower liquid phase. In the upper liquid phase, the polyethylene powder 19 is dispersed. After 30 minutes or more, the polyethylene powder 19 floats because the specific gravity of the polyethylene powder 19 is slightly smaller than that of the dispersion medium Y. At that time, the marking ink composition is in such a state as illustrated in FIG. 1C. When viewed through the top transparent portion, the display medium appears white, with no blue color being recognized. The reason why the blue color of the dye is never recognized is that not only slight adhesion of the dye solution X(A) to the polyethylene powder, but also physical adsorption of the molecules of dye by the polyethylene powder can be drastically reduced.

Most of dyes are provided with a polar moiety or hydrophilic moiety having π-bond in part of the molecule thereof. Therefore, the above-mentioned polar moiety or hydrophilic moiety of dye is easily adsorbed by the pigment powder which has a polar or hydrophilic portion. When the surface of the pigment powder comprises a hydrophobic or non-polar portion, the amount of dye to be adsorbed by the pigment powder can be decreased.

Further, when a polar or oil-repellent dispersion medium X is employed, the pigment powder can be effectively avoided from being coated with the dye solution X(A). In light of the above-mentioned factors, the combination of dye, pigment powder, and dispersion media X and Y are not limited to the above.

It is preferable that the hydrophobic or non-polar portion on the surface of the pigment powder be in the form of a layer which is provided by coating, chemical adsorption, or physical adsorption in order to prevent the dye solution from adhering to the surface of the pigment powder and to prevent the dye from being adsorbed by the pigment powder. Thus, color mixing of the dye and the pigment powder can be decreased.

The above-mentioned layer provided on the surface of the pigment powder will now be explained in more detail referring to FIG. 4.

In FIG. 4A, a pigment powder 20 is dispersed as it is in a marking ink composition of the present invention. It greatly depends on the surface properties of the pigment powder whether a dye solution is attached to the surface of the pigment powder, or whether the dye is adsorbed by the pigment powder. By providing a layer 21 comprising an inorganic material or a polymeric material on the surface of the pigment powder 20 by coating, as shown in FIG. 4B, the affinity of the layer 21 for the dye solution or dye can be optimized.

More specifically, when a titanium oxide powder is used as the pigment powder 20, preferable examples of the material for use in the coating layer 21 are silicon oxide, aluminum oxide, polyethylene, phenolic resin, poly(methyl acrylate), melamine resin, urea resin, Teflon resin, poly (vinylidene fluoride), polyvinyl alcohol, and polyethylene oxide.

When a nylon powder is used as the pigment powder 20, preferable examples of the material for use in the coating layer 21 are titanium oxide and aluminum oxide. These materials may be used alone or in combination.

For providing the coating layer 21 on the surface of the pigment powder 20, a polymeric material is dissolved in a solvent to prepare a solution, and thereafter, a bad solvent is added thereto. Alternately, the solubility of the polymeric material is lowered to separate out by decreasing the temperature. Further, mechano-chemical coating apparatus such as "Varitizer" and "Coatmizer" may be used.

In FIG. 4C, a layer is provided on the surface of a pigment powder 20 by covalent bonding. The affinity of a dye solution or dye for the pigment powder 20 can be adjusted by selecting ions of a chemically adsorbed material (A–B) 22, and properties of the side chain or end group of the material 22.

To be more specific, the above-mentioned chemical adsorption can be attained by titanium coupling, silane coupling, aluminum coupling, or graft polymerization. The pigment powder may be previously subjected to any of the above-mentioned treatment, or a reaction reagent may be added to the dispersion media in advance.

Specific examples of the titanium coupling agent for use in the present invention include isopropyl•triisostearoyl titanate, isopropyltris(dioctyl pyrophosphate)titanate, tetraoctylbis(ditridecylphosphite)titanate, isopropyl(N-aminoethyl-aminoethyl)titanate, tetraisopropylbis (dioctylphosphite)titanate, bis(dioctyl pyrophosphate) ethylene titanate, bis(dioctyl pyrophosphate)oxyacetate titanate, and isopropyltricumylphenyl titanate.

Specific examples of the silane coupling agent include vinyltriethoxysilane, N-phenyl-γ-aminopropyltrimethoxysilane, γ-chloropropyltrimethoxysilane, and γ-mercaptopropyltrimethoxysilane. Further, there can be employed a fluorosilane coupling agent such as pentadecafluorodecylyl trimethoxysilane.

As the aluminum coupling agent there can be used acetoalkoxyaluminum diisopropylate.

With respect to graft polymerization, titanium oxide may be subjected to graft polymerization together with polyethylene using methoxysilane group or chlorosilane group, or together with polystyrene using vinylisocyanate group. Further, silicon oxide may be subjected to graft polymerization using silanol group. In addition to the above, there can be utilized various kinds of graft polymerization using, for example, using siloxane group or a halogen group.

In FIG. 4D, a surfactant is physically adsorbed by the surface of a pigment powder 20. The affinity of a dye solution or dye for the pigment powder can be controlled by selecting ions of a physically adsorbed material 23, and controlling the properties of the side chain or end group of the material 23. For physical adsorption, not only an anionic surfactant, cationic surfactant, ampholytic surfactant, and nonionic surfactant, but also an organic solvent with a small amount is effective as the physically adsorbed material 23.

In addition, the use of a surfactant which has a fluorine group as a substituent is particularly effective in controlling the above-mentioned affinity.

Specific examples of the physically adsorbed surfactant are sodium laurate, sodium oleate, sodium lauryl sulfate, lauric acid, oleic acid, ammonium lauryl alcohol sulfate, sodium lauryl alcohol sulfate, sodium alkylbenzene sulfonate, "Aerosol OT", "Soromine A", lauryltylnetylammonium chloride, sodium laurylaminopropionate, polyethylene oxide, polyvinyl alcohol, poly(methyl methacrylate), polyacrylate, and an adduct of nonylphenylethylene oxide.

Further, there can be employed commercially available fluorochemical surfactants "FC-93", "FC-95", "FC-98", "FC-129", "FC-135", "FC-170", "FC-171", "FC-430", and "FC-431" (Trademarks), made by 3M Co.

The materials for forming a layer on the surface of the pigment powder by coating, chemical adsorption, or physical adsorption are not limited to the above-mentioned examples. Further, the layers formed by coating, chemical adsorption, and physical adsorption may be provided in combination on the surface of the pigment powder.

In the marking ink composition according to the present invention, it is preferable that the pigment powder comprise a magnetic powder. In this case, color display of the marking ink composition can be reversibly switched with no difficulty by using a magnet or electromagnet. The operation for reversibly changing the color display using a magnet is previously mentioned with reference to FIG. 1C.

Further, in the marking ink composition of the present invention, it is preferable that the pigment powder comprise an electrophoretic migration powder. In this case, color display of the marking ink composition can be reversibly changed by the application of a voltage thereto.

The embodiment of the marking ink composition comprising the electrophoretic migration powder will be explained in detail with reference to FIG. 5.

Figure 5A:
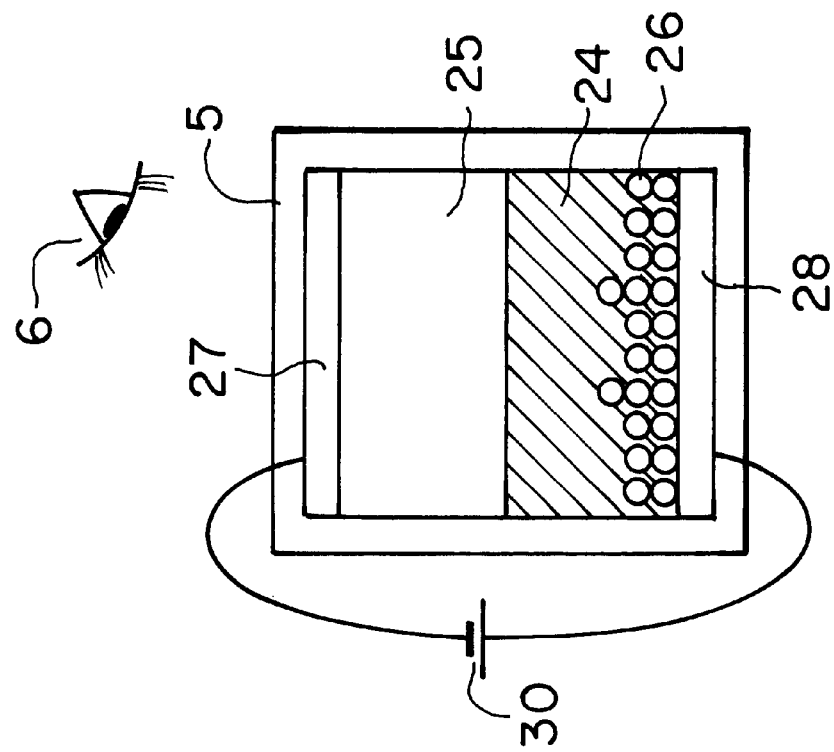
FIGS. 5(a) and 5(b) are schematic views showing a display medium using a marking ink composition according to the present invention which comprises a pigment powder comprising an electrophoretic migration powder.
Figure 5B:
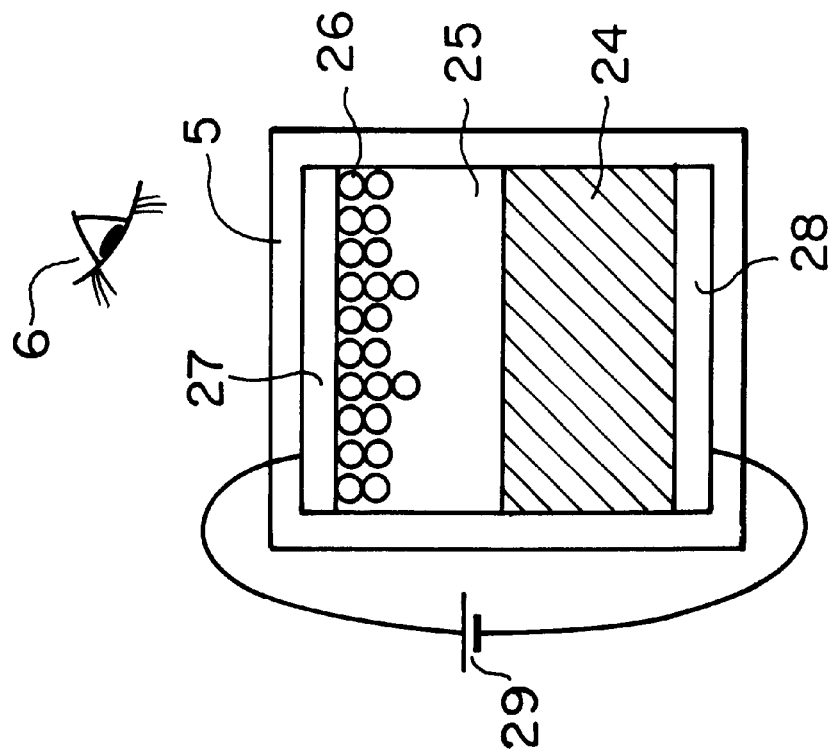

FIGS. 5A and 5B are each a schematic cross-sectional view of a display medium according to the present invention. In FIGS. 5A and 5B, a commercially available polyethylene powder (Trademark "PE", made by Merck & Co., Inc.) is used as a pigment powder 26. One of dispersion media capable of forming two immiscible liquid phases is water 24 (dispersion medium X), in which a water-soluble dye "Direct Blue 119" is dissolved, thereby forming a dye solution. The other dispersion medium (dispersion medium Y) is a non-polar mixture of hexane and tetrachloroethylene 25 in which the solubility of the above-mentioned water-soluble dye is very low. Reference numerals 27 and 28 indicate ITO electrodes, which are connected to a direct current source 29 in FIG. 5A or a direct current source 30 in FIG. 5B.

The polyethylene powder 26 is negatively charged in the dispersion medium. After a positive voltage of 1 V is applied to the upper electrode 27 for a short period of time, as shown in FIG. 5A, the polyethylene powder 26 causes electrophoretic migration to the upper electrode 27. At that time, the display medium appears a clear white color when viewed through a transparent top window 5 by an observer 6. In this case, no color mixing with the blue dye is recognized. On the other hand, after a negative voltage of −1 V is applied to the upper electrode 27 for a short period of time, as shown in FIG. 5B, the polyethylene powder 26 causes electrophoretic migration to the lower electrode 28. At that time, the display medium appears a clear blue color attributable to the blue dye when viewed through the transparent top window 5 by the observer 6. In this case, no color mixing with the white polyethylene powder occurs.

The above-mentioned operations can be electrically switched with no difficulty, and the operations are reversible. In addition, once the polyethylene powder is attached to the one electrode, the polyethylene powder remains being attracted to the electrode because of the van der Waals force even though the applied voltage is diminished. The legibility of this kind of display medium is similar to that of the electrochromic display medium because of high contrast and wide angle of field. Another advantage is low consumption power because it is not necessary to constantly apply a voltage to the display medium.

In the marking ink composition of the present invention, it is preferable that the pigment powder comprises an electrophoretic migration powder which comprises a magnetic portion. In this case, color display of the display medium can be reversibly switched by the application of a voltage thereto, and at the same time, the memory characteristics of the display medium can be enhanced by using the magnetic force. This embodiment will be explained in detail by referring to FIGS. 6A and 6B.

Figure 6A:
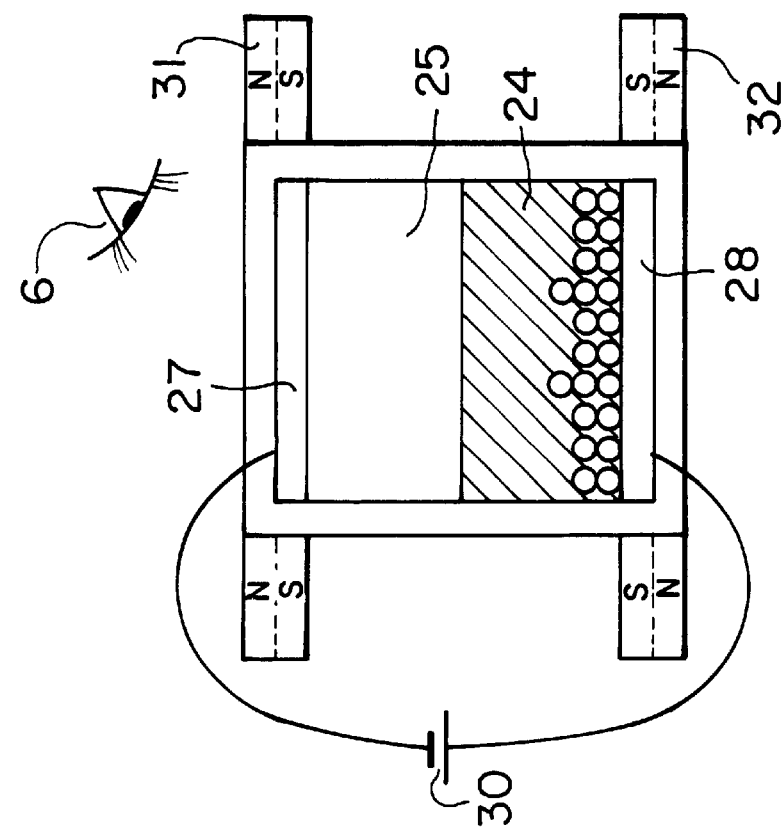
FIGS. 6(a) and 6(b) are schematic views showing a display medium using a marking ink composition according to the present invention which comprises a pigment powder comprising an electrophoretic migration powder with magnetic properties.
Figure 6B:
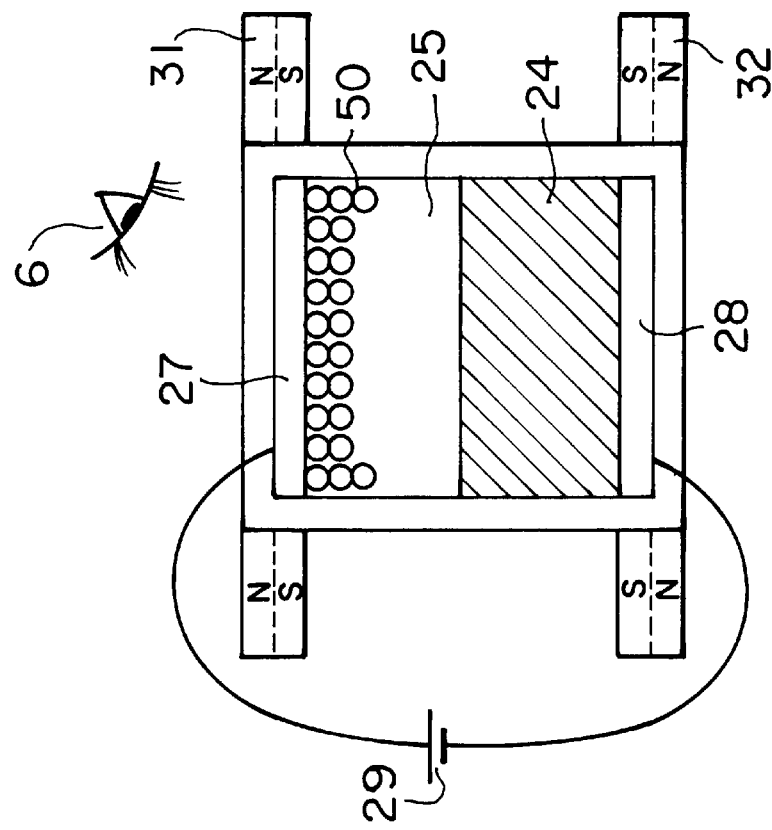

FIGS. 6A and 6B are each a schematic cross-sectional view of a display medium according to the present invention. In FIG. 6A, a phenolic-resin-coated iron powder 50 is used as the pigment powder. One of dispersion media capable of forming two immiscible liquid phases is water 24 (dispersion medium X), in which a water-soluble dye "Direct Blue 119" is dissolved, thereby forming a dye solution. The other dispersion medium (dispersion medium Y) is a non-polar mixture of hexane and tetrachloroethylene 25 in which the solubility of the above-mentioned water-soluble dye is very low. Reference numerals 27 and 28 indicate ITO electrodes, which are connected to a direct current source 29 in FIG. 6A or a direct current source 30 in FIG. 6B. Reference numeral 31 indicates a ring-shaped permanent magnet which is situated at the top of the display medium; reference numeral 32 indicates a ring-shaped permanent magnet which is situated at the bottom of the display medium.

The phenolic-resin-coated iron powder 50 is negatively charged in the dispersion medium. After a positive voltage of 1 V is applied to the upper electrode 27 for a short period of time, as shown in FIG. 6A, the phenolic-resin-coated iron powder 50 causes electrophoretic migration to the upper electrode 27. At that time, the display medium appears a yellow tinged black color attributable to the phenolic-resin-coated iron powder 50 when viewed through a transparent top portion by an observer 6. On the other hand, after a negative voltage of −1 V is applied to the upper electrode 27 for a short period of time, as shown in FIG. 6B, the phenolic-resin-coated iron powder 50 causes electrophoretic migration to the lower electrode 28. At that time, the display medium appears a clear blue color attributable to the blue dye.

When the display medium is in such a state as illustrated in FIG. 6A, ultrasonic wave is entirely applied to the container using an ultrasonic cleaning machine. The result is that the phenolic-resin-coated iron powder 50 apparently remains unchanged. Then, the application of ultrasonic wave to the container is repeated in the same manner as mentioned above except that the permanent magnets 31 and 32 are removed from the container. As a result, most of the phenolic-resin-coated iron particles attached to the upper electrode 27 are separated therefrom, and settles down to the bottom as shown in FIG. 6B, with the display medium being recognized as a blue color due to the dye. As mentioned above, the memory characteristics of the display medium can be enhanced by using the magnetic and electrophoretic migration powder.

The display medium of the present invention comprises the previously mentioned marking ink composition, and two plates for holding the ink composition therebetween, at least one of the plates comprising a transparent portion. The marking ink composition is thus held between the two plates, so that the phase separating states of the dispersion media X and Y can be uniformly maintained. Therefore, clear color display of every picture element can be attained.

One embodiment of a display medium according to the present invention will be described with reference to FIG. 7.

Figure 7:
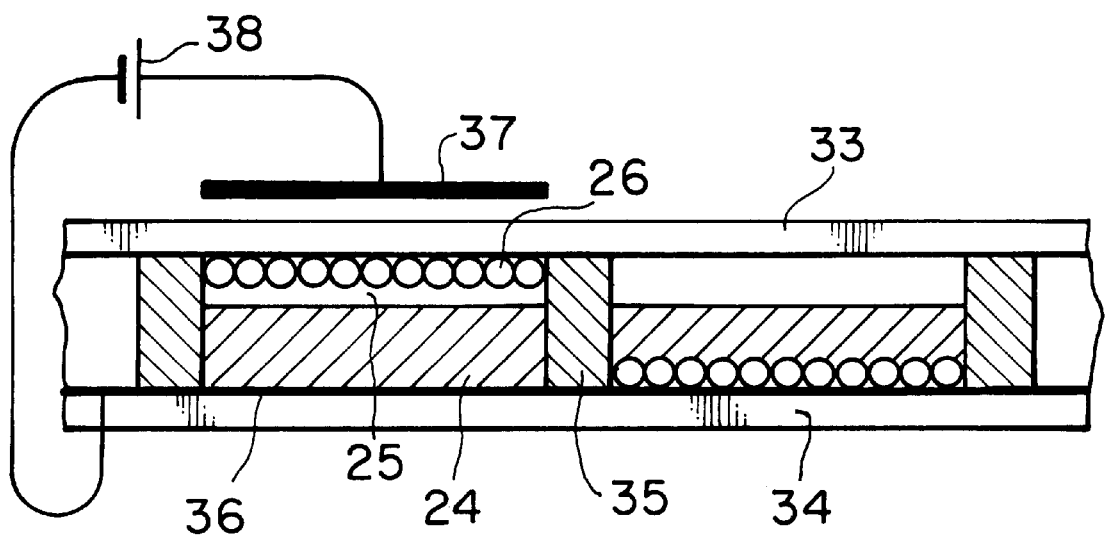
FIG. 7 is a schematic cross-sectional view of a display medium according to the present invention, in which an enclosed space for a marking ink composition is partitioned.

FIG. 7 is a schematic cross-sectional view of a display medium according to the present invention. In FIG. 7, a commercially available polyethylene powder (Trademark "PE", made by Merck & Co., Inc.) 26 is used as the pigment powder. One of dispersion media capable of forming two immiscible liquid phases is water 24 (dispersion medium X), in which a water-soluble dye "Direct Blue 119" is dissolved, thereby forming a dye solution. The other dispersion medium (dispersion medium Y) is a non-polar mixture of hexane and tetrachloroethylene 25 in which the solubility of the above-mentioned water-soluble dye is very low. The display medium shown in FIG. 7 comprises plates 33 and 34, between which the marking ink composition is held. An electrode 36 is disposed on one of the plate 33 or 34. Reference numeral 35 indicates a pillar for supporting the plates 33 and 34, which pillar also serves as a partition. The electrode 36 is connected to an electrode 37 which is disposed above the display medium, with a positive voltage being applied to the electrode 37 by a direct current source 38.

As illustrated in FIG. 7, the marking ink composition is partitioned into a lot of portions by the plates 33 and 34 and the pillar 35. Therefore, even when the display medium made of a lot of partitions is slanted, the composition of ink in each individual partition, for example, which comprises two dispersion media X and Y with different specific gravities for forming two immiscible liquid phases, does not change microscopically.

In addition, when an image is expressed by a white picture element and a blue picture element, the directions of electric fields applied to a white picture element and a blue picture element which are adjoining to each other are different. On the identical plane of the adjoining white picture element and blue picture element, an electric field is generated in a horizontal direction around the electrodes. Because of the thus generated electric field, the pigment particles constituting the white picture element tend to shift in a horizontal direction, so that the evenness of the picture element is hindered. By use of the embodiment shown in FIG. 7, however, the above-mentioned problem can be solved.

Examples of the material for the plates 33 and 34 include glass, polystyrene, polycarbonate, and polyethylene. The material is not limited to the above-mentioned examples, and a plate with multi-layered structure is usable.

In the display medium according to the present invention, the marking ink composition may be held in microcapsules. By holding the marking ink composition in microcapsules, a mixing ratio of the dispersion medium X to the dispersion medium Y can be constantly maintained, so that clear color display by each individual picture element can be attained.

One embodiment for carrying out the present invention will now be explained with reference to FIG. 8.

Figure 8:
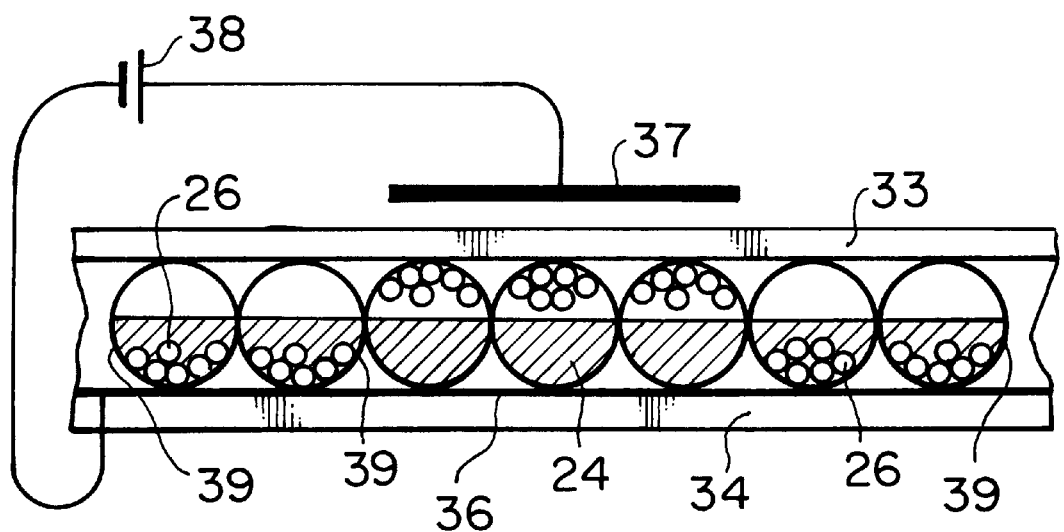
FIG. 8 is a schematic cross-sectional view of a display medium according to the present invention, in which a marking ink composition is held in microcapsules.

FIG. 8 is a schematic cross-sectional view of a display medium using microcapsules. In FIG. 8, microcapsules 39, each holding therein a marking ink composition, are disposed between plates 33 and 34. In such a case, the plates 33 and 34 are not always necessary. By use of microcapsules, each individual ink composition can stay independent. Therefore, even when the display medium made of a lot of microcapsules is slanted, the composition of ink in each individual microcapsule, for example, which comprises two dispersion media X and Y with different specific gravities for forming two immiscible liquid phases, does not change microscopically. In addition, the evenness of an image composed of two color picture elements, which is hindered by the electric field in a horizontal direction, can be maintained, as previously described.

In FIG. 8, reference numerals 24, 26, 36, 37, and 38 are the same as indicated in FIG. 7.

Examples of the material for forming a shell of the microcapsule are urea resin, melamine resin, urethane resin, gelatin, and acrylate.

The microcapsules can be obtained by interfacial polymerization, in-situ polymerization, or coacervation. It is preferable that the diameter of microcapsule be in the range of 1 to 1000 μm, more preferably 5 to 200 μm.

According to the above-mentioned methods for obtaining the microcapsules, the microcapsules are prepared in the form of a slurry containing water content. The slurry thus obtained may be dried to prepare particles. Alternatively, the slurry of microcapsules may be mixed with an aqueous solution of a binder agent to prepare a coating liquid. In this case, water-soluble polymers or prepolymers, such as polyvinyl alcohol, polyacrylamide, poly(acrylic acid), urea—formalin polymer, melamine—formalin polymer, or isobutylene—maleic anhydride polymer can be used as the above-mentioned binder agents.

The marking ink composition according to the present invention can be used not only as a marking ink for use in the previously mentioned display medium, but also as an ink composition for use in a marking pen and a sign pen. Further, the marking ink composition of the present invention can be applied to a variety of printing inks, for example, suitable for ink-jet printing, screen printing, offset printing, and electrophotographic printing. In particular, the marking ink composition according to the present invention is suitable for the jet printing ink for ink-jet printing.

When the above-mentioned marking ink composition of the present invention is used as a printing ink, there are two specific processes. One process is that the marking ink composition is used in such a manner that it is held in the display medium, and the other process is that the ink composition is directly deposited on an image receiving material. For the latter printing process, appropriate auxiliary components, such as a polymeric binder agent, surfactant, a coloring agent, and a color decolorization agent may be added to the ink composition according to the application.

A method for printing an image on an image receiving material according to the present invention comprises the steps of depositing the marking ink composition on the image receiving material, and removing the components of dispersion media from the image receiving material. Generally, an image is formed on a sheet of paper, but a metallic plate, polymer film, polymer sheet, and a ceramic film may be used as the image receiving material.

Furthermore, one of the dispersion media capable of forming two immiscible liquid phases may be emulsified, and it is effective that the pigment powder be accumulated at the interface between the two immiscible liquid phases.

When the marking ink composition of the present invention is used as a jet printing ink, color display of two or more colors can be achieved by using one kind of marking ink composition of the present invention.

One of the embodiments for carrying out the printing method according to the present invention will now be described with reference to FIG. 9 and FIG. 10. FIGS. 9 and 10 are schematic views in explanation of the printing method according to the present invention.

In FIG. 9, a marking ink composition comprising water 24 (dispersion medium X) in which a water-soluble dye is dissolved, a non-polar dispersion medium 25 (dispersion medium Y), and a pigment powder 26 is held in a container 40. The upper part in the container 40 is filled with an inert gas or a liquid different from the above-mentioned ink composition, which is capable of ejecting the ink composition from the container 40 onto a sheet of paper when a force is applied to the container 40 in the directions of 41a and 41b by means of piezoelectric device.

Figure 9A:
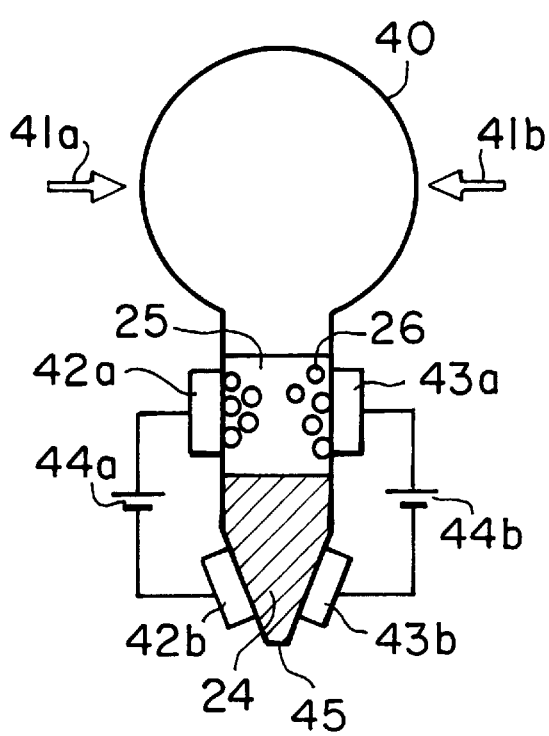
FIGS. 9(a) and 9(b) are schematic views in explanation of an ink jet printing method for depositing a marking ink composition of the present invention onto an image receiving material such as a sheet of paper.
Figure 10A:
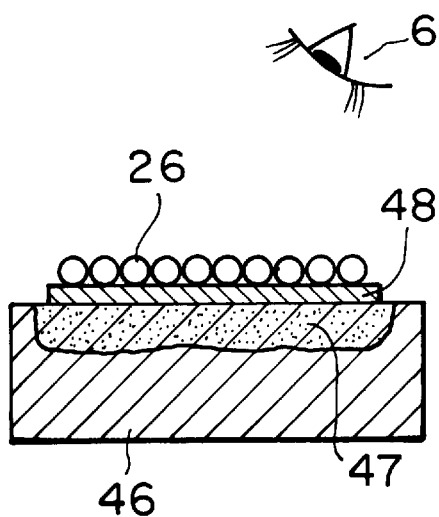
FIG. 10(a) is a schematic cross-sectional view which shows an image printed on the paper by the step of ink jet printing method of FIG. 9(a).

As shown in FIG. 9A, while a voltage is applied to the ink composition by direct current sources 44a and 44b so that upper electrodes 42a and 43a become positive with respect to lower electrodes 42b and 43b, the force is applied to the container in the directions of 41a and 41b by means of the piezoelectric device. The ink composition is ejected from the container through a nozzle 45, and deposited on a sheet of paper 46 as shown in FIG. 10A.

In this case, a layer of the pigment powder 26 is superimposed on a dye layer 48, so that only the color of the pigment powder 26 can be visually recognized by an observer 6.

Figure 9B:
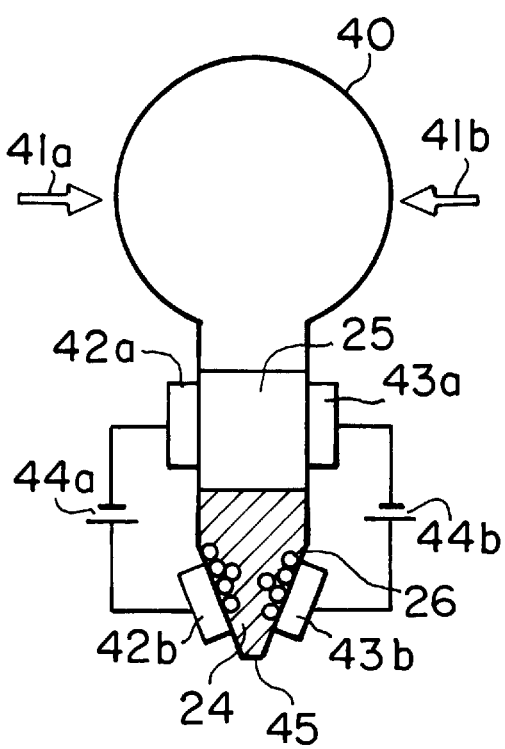
Figure 10B:
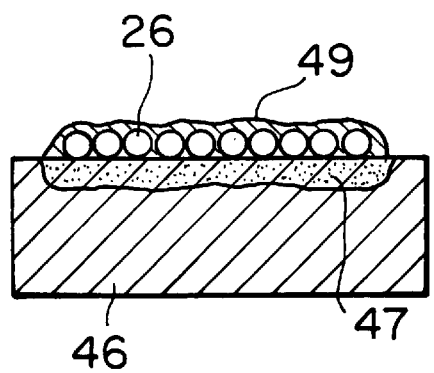
FIG. 10(b) is a schematic cross-sectional view which shows an image printed on the paper by the step of ink jet printing method of FIG. 9(b).

In FIG. 9B, a voltage is applied to the ink composition by direct current sources 44a and 44b so that the lower electrodes 42b and 43b become positive with respect to the upper electrodes 42a and 43a. When the ink composition is ejected from the container 40 through a nozzle 45 onto the paper 46, a dye layer 49 is formed so as to coat the pigment powder 26, as illustrated in FIG. 10B. The color obtained by mixing the pigment and the dye is recognized in this case. As previously explained, a plurality of colors can be displayed even though there is employed only one kind of marking ink composition.

Figure 12:
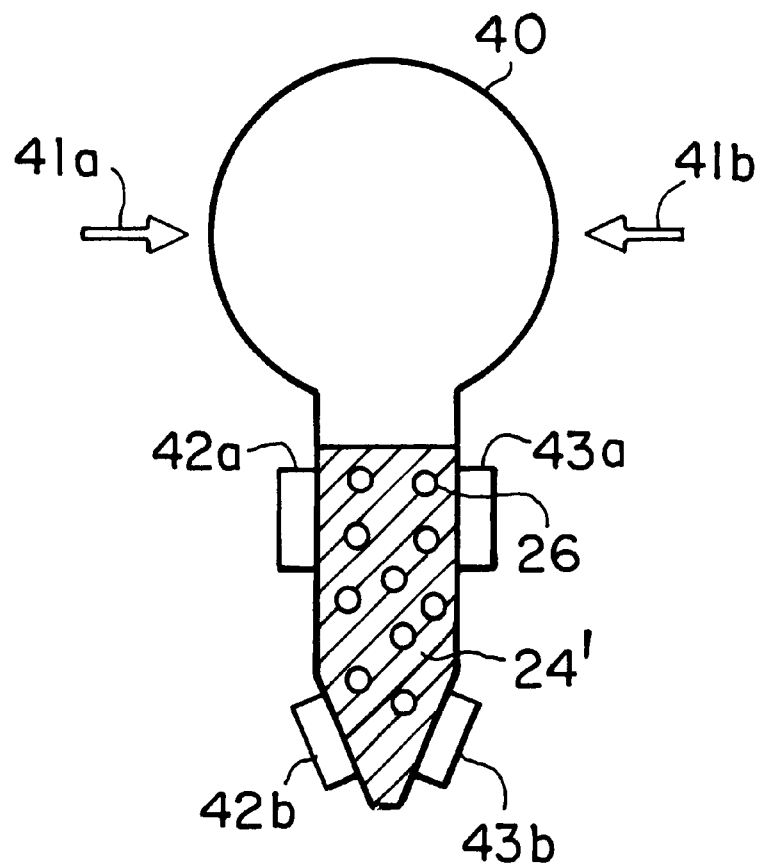
FIG. 12 is a schematic view in explanation of an ink jet printing method for depositing a conventional marking ink composition onto an image receiving material such as a sheet of paper.
Figure 13:
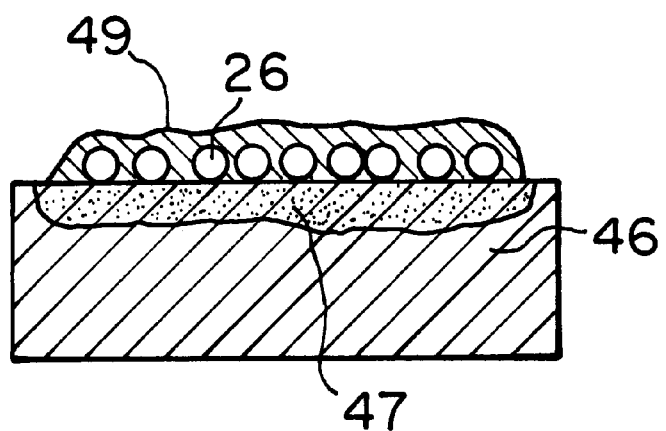
FIG. 13 is a schematic cross-sectional view which shows an image printed on the paper by the ink jet printing method of FIG. 12.

In contrast to this, FIG. 12 is a schematic view of a container for holding a conventional ink composition therein. The conventional ink composition shown in FIG. 12 comprises a single liquid phase 24' in which a dye is dissolved and a pigment 26 is dispersed. When the conventional ink composition of FIG. 12 is ejected from the container 40 onto a sheet of paper 46, as illustrated in FIG. 13, a dye 47 permeates through the paper 46, and at the same time, the pigment powder 26 is deposited on the paper 46 in such a manner that the pigment powder 26 is coated with a dye-solution layer 49. In this case, a color obtained by mixing the pigment and the dye is recognized.

In the above-mentioned ink-jet printing, the condition of pigment powder to be deposited onto the paper can be improved. More specifically, by use of a colorless (white color) dye, various properties of paper, such as water absorption properties, water resistance, degree of whiteness, apparent surface tension, and surface roughness can be improved. Further, a colorless pigment powder can be employed to serve as an overcoat layer for the dye layer. Namely, a thin film of the colorless pigment powder can be coated on a portion of paper wherein a dye is absorbed or a portion of paper on which a dye is attached. The result is that the dye image can be prevented from blurring by rubbing immediately after image formation. In addition, the color of the dye may be substantially the same as that of the pigment powder so as to improve the light resistance of color display. In such a case, part of the pigment powder may penetrate into the paper, or a part of the dye layer may be formed on the pigment powder.

Other features of this invention will become apparent in the course of the following description of exemplary embodiments, which are given for illustration of the invention and are not intended to be limiting thereof.

EXAMPLE 1

A commercially available dye "Macrolex Blue RR" (Trademark) was added in an amount of about 1.0 wt % to a mixture (serving as a dispersion medium X) of 3 parts by weight of tetrachloroethylene and 7 parts by weight of n-hexane. The dye was easily dissolved in the mixture to prepare a dye solution.

An iron powder was added in an amount of 10 wt % to water (serving as a dispersion medium Y). Water was stirred so as to prevent the iron powder from settling down, so that a dispersion of iron powder was prepared.

2.5 ml of the above-mentioned dye solution was mixed with 2.5 ml of the above-mentioned iron powder dispersion, to prepare a marking ink composition No. 1 according to the present invention, in which two immiscible liquid phases were formed.

The marking ink composition No. 1 thus prepared was placed in a container of which the top portion and the bottom portion were made of glass, and the container is tightly sealed. After application of ultrasonic wave to the glass container for 10 minutes, the ink composition was vigorously shaken, and then, allowed to stand on a glass plate. The state of the marking ink composition was visually observed from above.

30 minutes later, a ferrite magnet was brought into direct contact with an outer surface of the side wall of the container, and then removed therefrom, and disposed above the container. At that time, the iron powder was moved to the top of the container. Then, the ferrite magnet was again brought into contact with the outer surface of the side wall of the container, removed therefrom, and disposed under the glass plate. The result was that the iron powder was moved to the bottom of the container.

TABLE 1 shows the change in color display of the above-mentioned display medium employing the marking ink composition No. 1 when the display medium was observed from above.

TABLE 1

|  | Immediately after Standing | After 30 min. | Magnet Disposed above Container | Magnet Disposed under Container |
| --- | --- | --- | --- | --- |
| Ink composition | phase separation | phase separation | phase separation | phase separation |
| Iron powder | dispersed | completely settling down | moved to top of container | moved to bottom of container |
| Color display | blue-tinted black | blue | black slightly tinged with blue | blue |

COMPARATIVE EXAMPLE 1

A commercially available dye "Macrolex Blue RR" (Trademark) was added in an amount of about 0.5 wt % to a mixture of 3 parts by weight of tetrachloroethylene and 7 parts by weight of n-hexane, so that the dye was dissolved therein to prepare a dye solution. Thereafter, an iron powder (available from Wako Pure Chemicals Industries, Ltd.) was added to the above dye solution in an amount of 5 wt %. The thus obtained mixture was stirred so as to prevent the iron powder from settling down, whereby a comparative marking ink composition No. 1 was prepared.

The comparative marking ink composition No. 1 thus prepared was placed in the same container as employed in Example 1, and the container was tightly sealed. After application of ultrasonic wave for 10 minutes, the ink composition was vigorously shaken, and then, allowed to stand on a glass plate. The state of the marking ink composition was visually observed from above.

30 minutes later, a ferrite magnet was brought into direct contact with an outer surface of the side wall of the container, and then removed therefrom, and disposed above the container. Then, the ferrite magnet was again brought into contact with the outer surface of the side wall of the container, removed therefrom, and disposed under the glass plate in the same manner as in Example 1.

The change in color display of the above-mentioned comparative marking ink composition No. 1 is shown in TABLE 2 when viewed from above.

TABLE 2

|  | Immediately after Standing | After 30 min. | Magnet Disposed above Container | Magnet Disposed under Container |
| --- | --- | --- | --- | --- |
| Ink composition | single phase | single phase | single phase | single phase |
| Iron powder | dispersed | completely settling down | moved to top of container | moved to bottom of container |
| Color display | black-tinged blue | blue | black considerably tinged with blue | blue |

REFERENCE EXAMPLE 1

The effect of the solubility of a blue dye in a dispersion medium Y on the reflectance of a white color pigment powder was examined. In addition, the effect of the solubility of the blue dye in a dispersion medium X on the reflectance of a blue color was also examined.

The reflectance of the white pigment color can be examined in a marking ink composition of a single phase when the amount of pigment powder is sufficient and the hiding power of the employed pigment powder is sufficient. In such a case, the reflectance of the white pigment color is not influenced by the presence of a dispersion medium X.

The reflectance of the blue dye solution color can also be examined in a marking ink composition of a single phase in the case where the reflectance of the white pigment color disposed opposite to the blue color side is sufficiently large.

Therefore, it is possible to consider the reflectance of the white pigment color and that of the blue dye color in the two immiscible liquid phases by changing the concentration of the dye in a conventional single-phase ink composition.

A commercially available dye "Macrolex Blue RR" was added in a predetermined amount (from about 0.005 to 1 wt %) to a mixture of 3 parts by weight of tetrachloroethylene and 7 parts by weight of n-hexane to prepare a dye solution. Thereafter, a titanium oxide powder was added to the above dye solution in an amount of 10 wt %, so that the titanium oxide powder was dispersed in the dye solution.

After application of ultrasonic wave to the marking ink composition for 10 minutes, the dispersed state of the titanium oxide powder was maintained with stirring.

Thus, a marking ink composition was prepared. The thus obtained ink composition was placed in a container of which the bottom portion was made of a 25-μm-thick fluorinated ethylene propylene (FEP) film so that the height of the ink composition reached about 50 μm. The ink composition was allowed to stand for 30 minutes.

30 minutes later, the reflectance of a white color attributable to the titanium oxide powder which was gathered at the bottom was measured using a commercially available optical densitometer "DENSITOMETER TC-6MC" (Trademark), made by NIPPON DENSHOKU KOGYO Co., Ltd.

The same marking ink composition as prepared in the above was placed in a container of which the top portion was made of glass. The reflectance of a blue color attributable to the dye solution was measured at the top of the container using a commercially available measuring instrument "LCD EVALUATIONS SYSTEM" (Trademark), made by Otsuka Electronics Co., Ltd., with a sheet of plain paper having a reflectance of 80% being disposed under the bottom of the container.

At the same time, the white color and blue color of the marking ink composition were visually evaluated.

According to the measuring method using the above-mentioned commercially available measuring instrument made by Otsuka Electronics Co., Ltd., a light beam enters the object at an angle of 30°, and the reflectance is measured at a position perpendicular to the object. The reflectance is a relative value in comparison with the reflectance of a reference diffusing plate made of barium sulfate. Further, in practice, the reflectance of a blue color of the marking ink composition was measured over the glass plate with a thickness of 3 mm. Therefore, the reflectance obtained by the above-mentioned method is largely influenced by total reflection and luminous flux angle.

For example, a titanium oxide powder exhibits a reflectance of 90% or more when measured using an FEP film by the above-mentioned optical densitometer made by NIPPON DENSHOKU KOGYO Co., Ltd. However, when the above-mentioned titanium oxide powder is dispersed in a transparent liquid to obtain the reflectance of the titanium oxide powder using the above-mentioned measuring instrument made by Otsuka Electronics Co., Ltd., the reflectance is 45%. When such a difference in reflectance is taken into consideration, it is impossible to make absolute comparison.

In the above-mentioned measurement of the reflectance of a white pigment color, the reflectance is considered to vary depending on to which degree the pigment powder is coated with the dye solution in the marking ink composition of the present invention. Namely, a sufficiently high reflectance of the white pigment color, or a satisfactory whiteness degree by visual observation can provide a preferable solubility of the dye in the dispersion medium Y.

On the other hand, a preferable solubility of the dye in the dispersion medium X can be derived from a sufficiently low reflectance of the blue color of dye solution, or a satisfactory blueness by visual observation.

The results are shown in TABLE 3. In TABLE 3, degree of whiteness and degree of blueness by visual observation are evaluated on the following scale:

◎: excellent
○: good
Δ: slightly poor
X: poor

TABLE 3

| Concentration of Dye (wt %) | Optical Density of White Pigment Color | Reflectance of Blue Dye Color | Whiteness/ Blueness (by Visual Observation) |
| --- | --- | --- | --- |
| 0.0 | 0.073 | — | ◎/— |
| 0.005 | 0.092 | — | ◎/X |
| 0.01 | 0.090 | 10.2% | ◎/X |
| 0.05 | 0.107 | — | ○/X |
| 0.1 | 0.130 | — | ○/Δ |
| 0.2 | 0.205 | 5.5% | Δ/Δ |
| 0.3 | 0.274 | 3% | Δ/○ |
| 0.4 | 0.353 | 2.1% | Δ/○ |
| 0.5 | 0.431 | 1.4% | Δ/○ |
| 0.6 | 0.522 | 0.8% | X/◎ |
| 0.7 | 0.561 | — | X/◎ |
| 0.8 | 0.610 | — | X/◎ |
| 0.9 | 0.652 | — | X/◎ |
| 1.0 | 0.693 | 0.5% | X/◎ |

In TABLE 3, "—" means that the reflectance was not measured.

As can be seen from the results shown in TABLE 3, the white color optical density of 0.13 or less is regarded as acceptable. Correspondingly, it is confirmed that the solubility of dye in the dispersion medium Y is preferably 0.1 wt % or less. When the optical density of a white color is 0.13, the reflectance thereof is 70% or more, which is substantially equivalent to the reflectance of 80% of plain copy paper.

In addition, the results of visual observation concerning the degree of blueness indicate that it is preferable that the solubility of dye in the dispersion medium X be 0.6 wt % or more. In this case, however, the reflectance of a blue color is a relative value, so that it is difficult to judge the preferable solubility of dye in the dispersion medium X only from the reflectance of blue color. In general, the preferable solubility of dye in the dispersion medium X is such that the optical density of a dye solution free of a pigment powder is 0.8 or more, more preferably 1.0 or more.

EXAMPLE 2

An electrophoretic migration color display medium was fabricated in the form of a cell by the following method.

A commercially available dye "Macrolex Blue RR" was added in an amount of about 1.0 wt % to a mixture of 3 parts by weight of tetrachloroethylene and 7 parts by weight of n-hexane. The dye was easily dissolved in the mixture to prepare a dye solution.

A titanium oxide powder was added in an amount of 20 wt % to water. Water was stirred so as to prevent the titanium oxide powder from settling down, so that a dispersion of titanium oxide powder was prepared.

The above-mentioned dye solution and titanium oxide dispersion were mixed at a ratio by weight of 1:1 in a container. After application of ultrasonic wave to the container for 10 minutes, the above prepared mixture was vigorously shaken, whereby a marking ink composition No. 2 according to the present invention was prepared, in which two immiscible liquid phases were formed.

An ITO electrode with a surface resistivity of 100 Ω·cm$^2$ was provided on a 30 mm-thick blue glass plate (30 mm×50 mm). A two-pack epoxy resin serving as a room temperature curing sealer for liquid crystal was deposited on the ITO electrode of the blue glass plate along the four sides by screen printing so that the width of the sealer was about 1.5 mm. Two spacers, each having a thickness of 80 μm were placed on the opposite sides of the glass plate.

By use of a dispenser, a weighed quantity of the above-mentioned marking ink composition No. 2 was dropped to a structure made from the glass plate and the spacers. Another ITO-deposited blue glass plate was pressed against the spacers to overflow an excessive amount of marking ink composition in such a configuration that the ITO electrode came in contact with the ink composition, thereby obtaining a cell. The cell was allowed to stand for 12 hours with the application of a load of about 5 kg to the upper glass plate. Thus, an electrophoretic migration display medium according to the present invention was fabricated in the form of a cell.

One of the ITO electrodes was subjected to pretreatment with a commercially available silane coupling agent (Trademark "KBM3103C", made by Shin-Etsu Silicone Co., Ltd.) so as to increase the affinity of ITO for the solvent.

Using an electroconductive paste, the color display cell was connected to a direct current source. In addition, the color display cell was set in the commercially available reflectance measuring apparatus (Trademark "LCD EVALUATIONS SYSTEM", made by Otsuka Electronics Co., Ltd.). The reflectances of a white color attributable to the titanium oxide powder and a blue color attributable to the dye were measured in comparison with the reflectance of a reference reflecting plate made of barium sulfate (with a nominal reflectance of 99.6%). The measurement was carried out under the conditions that the spot size of light beam was about 3 mm, the incident angle was 30°, and the reflectance was measured at 0° after application of a voltage of +1 or −1 V or +10 or −10 V for a period of time ranging from 10 seconds to 10 minutes. The most preferable data was selected. At the same time, the white color and the blue color were visually evaluated.

For reference, the reflectance of white titanium oxide was 45% when the titanium oxide free of dye was measured.

The results are shown in TABLE 4.

The electrophoretic migration display cell prepared in Example 2 was designed to cause diffuse reflection. However, the reflectance of reflected ray only by direct reflection was measured, which was very different from the reflectance perceived by visual observation because there was a loss by total reflection due to the 3-mm-thick glass plate of the color display cell.

EXAMPLE 3

The procedure for fabrication of the electrophoretic migration color display medium in the form of a cell in Example 2 was repeated except that the marking ink composition No. 2 employed in Example 2 was replaced by a marking ink composition No. 3 prepared by the following method.

[Preparation of Marking Ink Composition No. 3]

A commercially available dye "Direct Blue 119" (made by Nippon Kayaku Co., Ltd.) was added in an amount of about 1.0 wt % to water. The dye was easily dissolved in water to prepare a dye solution.

A commercially available polyethylene powder (Trademark "PE", made by Merck & Co., Inc.) was added in an amount of 20 wt % to a mixture of 2 parts by weight of tetrachloroethylene and 8 parts by weight of n-hexane. This mixture was stirred so as to prevent the polyethylene powder from floating, so that a dispersion of polyethylene powder was prepared.

The above-mentioned dye solution and polyethylene powder dispersion were mixed at a ratio by weight of 1:1 in a container. After application of ultrasonic wave to the container for 10 minutes, the above prepared mixture was vigorously shaken, whereby a marking ink composition No. 3 according to the present invention was prepared, in which two immiscible liquid phases were formed.

The reflectances of colors displayed by the electrophoretic migration color display medium in the form of a cell were measured in the same manner as in Example 2. The results are shown in TABLE 4.

EXAMPLE 4

The procedure for fabrication of the electrophoretic migration color display medium in the form of a cell in Example 2 was repeated except that the marking ink composition No. 2 employed in Example 2 was replaced by a marking ink composition No. 4 prepared by the following method.

[Preparation of Marking Ink Composition No. 4]

A commercially available dye "Direct Blue 119" (made by Nippon Kayaku Co., Ltd.) was added in an amount of about 1.0 wt % to water. The dye was easily dissolved in water to prepare a dye solution.

A commercially available polyethylene powder (Trademark "PE", made by Merck & Co., Inc.) was added in an amount of 40 wt % to a mixture of 2 parts by weight of tetrachloroethylene and 8 parts by weight of n-hexane. This mixture was stirred so as to prevent the polyethylene powder from floating, so that a dispersion of polyethylene powder was prepared.

The above-mentioned dye solution and polyethylene powder dispersion were mixed at a ratio by weight of 3:1 in a container. After application of ultrasonic wave to the container for 10 minutes, the above prepared mixture was vigorously shaken, whereby a marking ink composition No. 4 according to the present invention was prepared, in which two immiscible liquid phases were formed.

The reflectances of colors displayed by the electrophoretic migration color display medium in the form of a cell were measured in the same manner as in Example 2. The results are shown in TABLE 4.

EXAMPLE 5

The procedure for fabrication of the electrophoretic migration color display medium in the form of a cell in Example 2 was repeated except that the marking ink composition No. 2 employed in Example 2 was replaced by a marking ink composition No. 5 prepared by the following method.

[Preparation of Marking Ink Composition No. 5]

A commercially available dye "Direct Blue 119" (made by Nippon Kayaku Co., Ltd.) was added in an amount of about 1.0 wt % to water. The dye was easily dissolved in water to prepare a dye solution.

A commercially available polyethylene powder (Trademark "PE", made by Merck & Co., Inc.) was added in an amount of 8.0 wt % to a mixture of 2 parts by weight of tetrachloroethylene and 8 parts by weight of n-hexane. This mixture was stirred so as to prevent the polyethylene powder from floating, so that a dispersion of polyethylene powder was prepared.

The above-mentioned dye solution and polyethylene powder dispersion were mixed at a ratio by weight of 7:1 in a container. After application of ultrasonic wave to the container for 10 minutes, the above prepared mixture was vigorously shaken, whereby a marking ink composition No. 5 according to the present invention was prepared, in which two immiscible liquid phases were formed.

The reflectances of colors displayed by the electrophoretic migration color display medium in the form of a cell were measured in the same manner as in Example 2. The results are shown in TABLE 4.

EXAMPLE 6

The procedure for fabrication of the electrophoretic migration color display medium in the form of a cell in Example 2 was repeated except that the marking ink composition No. 2 employed in Example 2 was replaced by a marking ink composition No. 6 prepared by the following method.

[Preparation of Marking Ink Composition No. 6]

A commercially available dye "Direct Blue 119" (made by Nippon Kayaku Co., Ltd.) was added in an amount of about 1.0 wt % to water. The dye was easily dissolved in water to prepare a dye solution.

A surface-treated titanium oxide powder was added in an amount of 20 wt % to a mixture of 2 parts by weight of tetrachloroethylene and 8 parts by weight of n-hexane. This mixture was stirred so as to prevent the titanium oxide powder from settling down, so that a dispersion of titanium oxide powder was prepared.

The above-mentioned surface-treated titanium oxide powder was prepared by mixing a commercially available titanium oxide with isopropyl•triisostearoyltitanate (Trademark "PLENACT KRTTS", made by Ajinomoto Fine-Techno Co., Inc.) in an amount of 1 wt % in an acidic aqueous solution, and washing and drying the titanium oxide powder. The surface of the titanium oxide powder was made lipophilic by such a surface treatment.

The above-mentioned dye solution and the dispersion of surface-treated titanium oxide powder were mixed at a ratio by weight of 1:1 in a container. After application of ultrasonic wave to the container for 10 minutes, the above prepared mixture was vigorously shaken, whereby a marking ink composition No. 6 according to the present invention was prepared, in which two immiscible liquid phases were formed.

The reflectances of colors displayed by the electrophoretic migration color display medium in the form of a cell were measured in the same manner as in Example 2. The results are shown in TABLE 4.

EXAMPLE 7

The procedure for fabrication of the electrophoretic migration color display medium in the form of a cell in Example 2 was repeated except that the marking ink composition No. 2 employed in Example 2 was replaced by a marking ink composition No. 7 prepared by the following method.

[Preparation of Marking Ink Composition No. 7]

A commercially available dye "Direct Blue 119" (made by Nippon Kayaku Co., Ltd.) was added in an amount of about 1.0 wt % to water. The dye was easily dissolved in water to prepare a dye solution.

A surface-treated titanium oxide powder was added in an amount of 20 wt % to a mixture of 2 parts by weight of tetrachloroethylene and 8 parts by weight of n-hexane. This mixture was stirred so as to prevent the titanium oxide powder from settling down, so that a dispersion of titanium oxide powder was prepared.

The above-mentioned surface-treated titanium oxide powder was prepared by coating a commercially available titanium oxide powder (Trademark "Tipaque R60-2", made by Ishihara Sangyo Kaisha, Ltd.) with a mixture of alumina and an organic material to make the surface of the titanium oxide powder lipophilic.

The above-mentioned dye solution and the dispersion of surface-treated titanium oxide powder were mixed at a ratio by weight of 1:1 in a container. After application of ultrasonic wave to the container for 10 minutes, the above prepared mixture was vigorously shaken, whereby a marking ink composition No. 7 according to the present invention was prepared, in which two immiscible liquid phases were formed.

The reflectances of colors displayed by the electrophoretic migration color display medium in the form of a cell were measured in the same manner as in Example 2. The results are shown in TABLE 4.

EXAMPLE 8

The procedure for fabrication of the electrophoretic migration color display medium in the form of a cell in Example 2 was repeated except that the marking ink composition No. 2 employed in Example 2 was replaced by a marking ink composition No. 8 prepared by the following method.

[Preparation of Marking Ink Composition No. 8]

A commercially available dye "Direct Blue 119" (made by Nippon Kayaku Co., Ltd.) was added in an amount of about 1.0 wt % to water. The dye was easily dissolved in water to prepare a dye solution.

A titanium oxide powder in an amount of 20 wt %, and oleic acid in an amount of 2.5 wt % were added to a mixture of 2 parts by weight of tetrachloroethylene and 8 parts by weight of n-hexane. The surface of the titanium oxide powder was made lipophilic. The resultant mixture was stirred so as to prevent the titanium oxide powder from settling down, so that a dispersion of titanium oxide powder was prepared.

The above-mentioned dye solution and the dispersion of surface-treated titanium oxide powder were mixed at a ratio by weight of 1:1 in a container. The oleic acid was not dissolved in water after phase separation because of the solubility of oleic acid in water was remarkably low. After application of ultrasonic wave to the container for 10 minutes, the above prepared mixture was vigorously shaken, whereby a marking ink composition No. 8 according to the present invention was prepared, in which two immiscible liquid phases were formed.

The reflectances of colors displayed by the electrophoretic migration color display medium in the form of a cell were measured in the same manner as in Example 2. The results are shown in TABLE 4.

COMPARATIVE EXAMPLE 2

The procedure for fabrication of the electrophoretic migration color display medium in the form of a cell in Example 2 was repeated except that the marking ink composition No. 2 employed in Example 2 was replaced by a comparative marking ink composition No. 2 prepared by the following method.

Preparation of Comparative Marking Ink Composition No. 2

A commercially available dye "Macrolex Blue RR" was added in an amount of about 0.5 wt % to a mixture of 3 parts by weight of tetrachloroethylene and 7 parts by weight of n-hexane. The dye was easily dissolved in the above mixture to prepare a dye solution. Further, a titanium oxide powder was added in an amount of 10 wt % to the above prepared dye solution. The resultant mixture was stirred so as to prevent the titanium oxide powder from settling down, so that a dispersion of titanium oxide powder was prepared in a container.

After application of ultrasonic wave to the container for 10 minutes, the above prepared mixture was vigorously shaken, whereby a comparative ink composition No. 2 was prepared.

The reflectances of colors displayed by the comparative electrophoretic migration color display medium in the form of a cell were measured in the same manner as in Example 2. The results are shown in TABLE 4.

COMPARATIVE EXAMPLE 3

The procedure for fabrication of the electrophoretic migration color display medium in the form of a cell in Example 2 was repeated except that the marking ink composition No. 2 employed in Example 2 was replaced by a comparative marking ink composition No. 3 prepared by the following method.

Preparation of Comparative Marking Ink Composition No. 3

A commercially available dye "Macrolex Blue RR" was added in an amount of about 0.5 wt % to a mixture of 3 parts by weight of tetrachloroethylene and 7 parts by weight of n-hexane. The dye was easily dissolved in the above mixture to prepare a dye solution. Further, a commercially available polyethylene powder (Trademark "PE", made by Merck & Co., Inc.) was added in an amount of 10 wt % to the above prepared dye solution. The resultant mixture was stirred so as to prevent the polyethylene powder from floating, so that a dispersion of polyethylene powder was prepared in a container.

After application of ultrasonic wave to the container for 10 minutes, the above prepared mixture was vigorously shaken, whereby a comparative marking ink composition No. 3 was prepared.

The reflectances of colors displayed by the comparative electrophoretic migration color display medium in the form of a cell were measured in the same manner as in Example 2. The results are shown in TABLE 4.

COMPARATIVE EXAMPLE 4

The procedure for fabrication of the electrophoretic migration color display medium in the form of a cell in Example 2 was repeated except that the marking ink composition No. 2 employed in Example 2 was replaced by a comparative marking ink composition No. 4 prepared by the following method.

Preparation of Comparative Marking Ink Composition No. 4

A commercially available dye "Direct Blue 119" (made by Nippon Kayaku Co., Ltd.) was added in an amount of about 0.5 wt % to water. The dye was easily dissolved in water to prepare a dye solution. Further, a commercially available polyethylene powder (Trademark "PE", made by Merck & Co., Inc.) was added in an amount of 10 wt % to the above prepared dye solution. The resultant mixture was stirred so as to prevent the polyethylene powder from floating, so that a dispersion of polyethylene powder was prepared in a container.

After application of ultrasonic wave to the container for 10 minutes, the above prepared mixture was vigorously shaken, whereby a comparative ink composition No. 4 was prepared.

The reflectances of colors displayed by the comparative electrophoretic migration color display medium in the form of a cell were measured in the same manner as in Example 2. The results are shown in TABLE 4.

COMPARATIVE EXAMPLE 5

The procedure for fabrication of the electrophoretic migration color display medium in the form of a cell in Example 2 was repeated except that the marking ink composition No. 2 employed in Example 2 was replaced by a comparative marking ink composition No. 5 prepared by the following method.

Preparation of Comparative Marking Ink Composition No. 5

A commercially available dye "Direct Blue 119" (made by Nippon Kayaku Co., Ltd.) was added in an amount of about 0.5 wt % to water. The dye was easily dissolved in water to prepare a dye solution. Further, a titanium oxide powder (available from Kanto Chemical Co., Inc.) was added in an amount of 10 wt % to the above prepared dye solution. The resultant mixture was stirred so as to prevent the titanium oxide powder from settling down, so that a dispersion of titanium oxide powder was prepared in a container.

After application of ultrasonic wave to the container for 10 minutes, the above prepared mixture was vigorously shaken, whereby a comparative marking ink composition No. 5 was prepared.

The reflectances of colors displayed by the comparative electrophoretic migration color display medium in the form of a cell were measured in the same manner as in Example 2. The results are shown in TABLE 4.

TABLE 4

|  | Reflectance of White Color (%) | Reflectance of Blue Color (%) | Whiteness/ Blueness (by Visual Evaluation) |
| --- | --- | --- | --- |
| Ex. 3 | 16.2 | 0.51 | ○/◉ |
| Ex. 4 | 29.2 | 1.52 | ◎/△ |
| Ex. 5 | 23.0 | 0.96 | ◎/○ |
| Ex. 6 | 21.5 | 0.64 | ◎/◉ |
| Ex. 7 | 26.2 | 1.51 | ◎/△ |
| Ex. 8 | 28.4 | 1.52 | ◎/△ |
| Ex. 9 | 21.7 | 1.50 | ◎/△ |
| Comp. Ex. 2 | 10.5 | 0.52 | △/◉ |
| Comp. Ex. 3 | 8.2 | 0.51 | X/◉ |
| Comp. Ex. 4 | 9.1 | 1.51 | X/△ |
| Comp. Ex. 5 | 13.2 | 1.50 | △/△ |

The visual evaluation was carried out on the same scale as in TABLE 3.

The data in TABLE 4 should be considered in light of the difference in molar absorption coefficient between the dyes, "Direct Blue 119" and "Macrolex Blue RR", and the difference in hiding power between the pigment powders, polyethylene powder and titanium oxide powder.

EXAMPLE 9

An electrophoretic migration color display medium was fabricated in the form of a cell using microcapsules by the following method.

A commercially available dye "Macrolex Blue RR" was added in an amount of about 1.0 wt % to a mixture of 3 parts by weight of tetrachloroethylene and 7 parts by weight of n-hexane. The dye was easily dissolved in the mixture to prepare a dye solution.

A polyethylene powder (Trademark "PE", made by Merck & Co., Inc.) was added in an amount of 80 wt % to water. To this mixture of water and polyethylene powder, a plurality of surfactants was added to temporarily emulsify water. The resultant mixture was stirred so as to prevent the polyethylene powder from floating, so that a dispersion of polyethylene powder was prepared.

The above-mentioned dye solution and polyethylene powder dispersion were mixed at a ratio by weight of 7:1 in a container. After application of ultrasonic wave to the container for 10 minutes, the above prepared mixture was vigorously shaken, whereby a marking ink composition No. 9 according to the present invention was prepared.

The thus prepared marking ink composition No. 9 was mixed with an aqueous solution in which a commercially available polyvinyl alcohol (Trademark "POVAL", made by Kuraray Co., Ltd.), a surfactant, and a prepolymer of melamine resin were previously dissolved, with stirring. The amount of the above-mentioned aqueous solution was 1.5 times that of the marking ink composition No. 9. Thus, microcapsules, each containing therein the marking ink composition comprising substantially the same two immiscible liquid phases as initially obtained, were synthesized at 60 to 80° C. In other words, microcapsules were synthesized from an emulsion of water-in-oil-in-water (W/O/W) type.

Thereafter, a mixture of 1 part by weight of polyvinyl alcohol (Trademark "#500" made by Kanto Chemical Co., Inc.) and 10 parts by weight of water was stirred for 2 hours at room temperature, so as to completely dissolve the polyvinyl alcohol in water. With the addition of 9 parts by weight of the slurry of microcapsules to the above aqueous solution of polyvinyl alcohol, the resultant mixture was stirred for 5 minutes in a homogenizer at a revolution of 5000 rpm. Thus, a coating liquid comprising microcapsules was prepared.

A weighed quantity of the coating liquid including the microcapsules was coated on an ITO-deposited surface (with a surface resistivity of 200 $\Omega.cm^2$) of the ITO-deposited polycarbonate substrate using an applicator with a gap of 250 µm, and dried at 90° C. for 10 minutes so that the thickness of the coated microcapsule layer was about 60 to 100 µm.

The polycarbonate substrate bearing the microcapsule layer thereon was cut into a piece with an appropriate size. The piece of polycarbonate substrate was closely attached to an ITO-deposited surface (with a surface resistivity of 100 $\Omega.cm^2$) of the ITO-deposited blue glass plate with a thickness of 3 mm in such a configuration that the microcapsule layer was brought into contact with the ITO-deposited surface. The thus laminated material was fixed with a tape.

The electrophoretic migration color display medium according to the present invention was fabricated in the form of cell using microcapsules.

The reflectances of colors displayed by the electrophoretic migration color display medium in the form of a cell were measured in the same manner as in Example 2. The results are shown in TABLE 5.

COMPARATIVE EXAMPLE 6

The procedure for fabrication of the electrophoretic migration color display medium in the form of a cell using microcapsules in Example 9 was repeated except that the marking ink composition No. 9 employed in Example 9 was replaced by a comparative marking ink composition No. 6 prepared by the following method.

Preparation of Comparative Marking Ink Composition No. 6

A commercially available dye "Macrolex Blue RR" was added in an amount of about 0.5 wt % to a mixture of 3 parts by weight of tetrachloroethylene and 7 parts by weight of n-hexane. The dye was easily dissolved in the mixture to prepare a dye solution.

A polyethylene powder (Trademark "PE", made by Merck & Co., Inc.) was added in an amount of 10 wt % to the above prepared dye solution. The resultant mixture was stirred so as to prevent the polyethylene powder from floating, so that a dispersion of polyethylene powder was prepared in a container.

After application of ultrasonic wave to the container for 10 minutes, the above prepared mixture was vigorously shaken, whereby a comparative marking ink composition No. 6 was prepared.

The reflectances of colors displayed by the comparative electrophoretic migration color display medium in the form of a cell were measured in the same manner as in Example 2. The results are shown in TABLE 5.

EXAMPLE 10

An electrophoretic migration color display medium was fabricated in the form of a cell using microcapsules by the following method.

A commercially available dye "Macrolex Blue RR" was added in an amount of about 1.0 wt % to a mixture of 3 parts by weight of tetrachloroethylene and 7 parts by weight of n-hexane. The dye was easily dissolved in the mixture to prepare a dye solution.

An iron powder (available from Wako Pure Chemicals Industries, Ltd.) was added in an amount of 80 wt % to water. To this mixture of water and iron powder, a plurality of surfactants was added to temporarily emulsify water. The resultant mixture was stirred so as to prevent the iron powder from settling down, so that a dispersion of iron powder was prepared.

The above-mentioned dye solution and iron powder dispersion were mixed at a ratio by weight of 7:1 in a container. After application of ultrasonic wave to the container for 10 minutes, the above prepared mixture was vigorously shaken, whereby a marking ink composition No. 10 according to the present invention was prepared.

The thus prepared marking ink composition No. 10 was prepared in the form of microcapsules in the same manner as in Example 9.

The electrophoretic migration color display medium according to the present invention in the form of cell using microcapsules was fabricated in the same manner as in Example 9 except that a metal mesh (200 mesh) made of iron was interposed between the ITO-deposited surface of the glass plate and the microcapsule layer. Further, a magnet was disposed so as to come in contact with a part of the metal mesh.

The reflectances of colors displayed by the electrophoretic migration color display medium in the form of a cell were measured in the same manner as in Example 2. The results are shown in TABLE 5.

EXAMPLE 11

An electrophoretic migration color display medium was fabricated in the form of a cell using microcapsules by the same method as in Example 10 except that the metal mesh was not interposed between the ITO-deposited surface of the glass plate and the microcapsule layer.

TABLE 5 shows the reflectances of colors attributable to each individual pigment powder and dye solution in the electrophoretic migration color display media fabricated in Examples 9, 10, and 11, and Comparative Example 6.

As is apparent from the results shown in TABLE 5, it is confirmed that the reflectance of a blue color attributable to the color of dye can be increased by employing the form of microcapsules.

In Example 10, the reflectance of dye color is increased owing to the presence of the metal mesh.

To confirm the improvement of memory characteristics of the color display in Examples 10 and 11, ultrasonic wave was applied to the color display cell for 10 minutes, and the change in color attributable to the pigment powder was checked. The memory characteristics of color display obtained in Example 10 were superior to those obtained in Example 11.

TABLE 5

|  | Reflectance of Pigment Powder (%) | Reflectance of Dye (%) | Color Display by Pigment before/after Application of Ultrasonic Wave |
| --- | --- | --- | --- |
| Ex. 9 | 22.0 | 5.2 | —/— |
| Comp. Ex. 6 | 9.1 | 4.8 | —/— |
| Ex. 10 | 6.5 | 9.3 | Black/Black |
| Ex. 11 | 2.5 | 3.6 | Black/Blue-tinged black |

REFERENCE EXAMPLE 2

Preparation of Microcapsules

A mixed solvent for forming a single liquid phase was prepared by mixing isooctane(2,2,4-trimethylpentane) which was maintained at about 60° C. and a commercially available fluorinated hydrocarbon "Fluorinert FC40" (Trademark), made by Sumitomo 3M Limited., at a mixing ratio by volume of 1:1.

200 g of the above prepared mixed solvent, which was maintained at about 60° C., was added to about 300 g of an aqueous solution in which a commercially available polyvinyl alcohol "POVAL 203" (Trademark), made by Kuraray Co., Ltd., in an amount of about 3%, a surfactant, an additive, and 70 g of a commercially available melamine-formaldehyde prepolymer "Sumirez Resin 613" (Trademark), made by Sumitomo Chemical Co., Ltd., with the above-mentioned aqueous solution being also maintained at about 60° C. The resultant mixture was stirred in a stirrer "T.K. homo-mixer" made by Tokushu Kika Kogyo Co., Ltd., at a revolution of about 8000 rpm for 5 minutes, with the temperature of the mixture being maintained at about 60° C., thereby obtaining an emulsion. Thereafter, the emulsion was stirred using a low-speed stirrer at a revolution of about 300 rpm for 3 hours. Thus, microcapsules were obtained.

The thus obtained microcapsules were washed with a large quantity of water, and dried at 80° C. The dried microcapsules were observed using a reflection type optical microscope at a magnification of 200× to 1000× at room temperature (about 25° C.).

The distribution of diameters of the obtained microcapsules was wide, ranging from 10 to 100 μm.

The interface between the two liquid phases was observed around the center in any capsules. With respect to the axis perpendicular to the interface, the height of one phase to the other phase was in the range of (50:50) to (55:45). Namely, it was confirmed that the volume ratio of the two liquid phases in microcapsules almost corresponds to that of the two liquids initially prepared in the container. The interface disappeared, and the two liquid phases were changed into a single phase when the microcapsules were heated at 47° C. or more.

REFERENCE EXAMPLE 3

Preparation of Microcapsules

The procedure for preparation of the microcapsules in Reference Example 2 was repeated except that a blue dye "Macrolex Blue RR" (Trademark) in an amount of 0.2 wt %, a titanium dioxide powder with an average particle diameter of 0.21 μm "CR60" (Trademark), made by Ishihara Sangyo Kaisha, Ltd., which was surface-treated with an aluminum material, in an amount of 15 wt %, and oleic acid in an amount of 0.3 wt % were added to the mixed solvent of isooctane and fluorinated hydrocarbon.

The thus obtained microcapsules were classified to have an average particle diameter of 50 to 150 μm.

When the obtained microcapsules were observed using an optical microscope, one of the liquid phases in the microcapsules assumed a strong blue color at room temperature, and the other liquid phase was practically colorless. It was confirmed that the above-mentioned difference in color between the liquid phases results from the difference in solubility of the blue dye between isooctane and fluorinated hydrocarbon when the mixed solvent was observed at room temperature before preparation of the microcapsules.

Further, more titanium dioxide particles were observed in the blue liquid phase than in the colorless liquid phase in the microcapsules.

As mentioned above, it was confirmed that two liquid phases with different absorbances, that is, a liquid phase colored with a dye and a non-colored liquid phase, were held in a microcapsule, with a white pigment powder being contained therein.

EXAMPLE 12

A commercially available dye "Macrolex Blue RR" was added in an amount of about 0.5 wt % to a mixture of 3 parts by weight of tetrachloroethylene and 7 parts by weight of n-hexane. The dye was easily dissolved in the above mixture to prepare a dye solution.

A commercially available polyethylene powder (Trademark "PE", made by Merck & Co., Inc.) was added in an amount of 10 wt % to water. The resultant mixture was stirred so as to prevent the polyethylene powder from aggregating, so that a dispersion of polyethylene powder was prepared.

The above-mentioned dye solution and dispersion of polyethylene powder were mixed at a ratio by weight of 1:1 in a container.

After application of ultrasonic wave to the container for 10 minutes, the above prepared mixture was vigorously shaken, whereby a marking ink composition according to the present invention was prepared.

100 micro-liter of the above prepared marking ink composition was put in a dispenser. The tip portion of the dispenser was provided with two metal plates, that is, an upper electrode and a lower electrode, which were connected to a direct current source. A voltage of 10 V was applied in such a manner that the upper electrode was positive or negative with respect to the lower electrode for 30 seconds. Thereafter, the marking ink composition was allowed to drop onto a sheet of ink-jet recording paper by manual operation, and then dried at room temperature. Thus, an ink image was formed on the paper.

The reflectance of the ink image on the paper was measured in the case where a voltage of 10 V was applied so as to make the upper electrode positive with respect to the lower electrode. Similarly, the reflectance of the ink image was measured in the case where a voltage of 10 V was applied so as to make the upper electrode negative with respect to the lower electrode.

The results are shown in TABLE 6. TABLE 6 also shows the colors of the above-mentioned ink images according to visual observation.

COMPARATIVE EXAMPLE 7

The procedure for formation of the ink images on a sheet of ink-jet recording paper in Example 12 was repeated except that the marking ink composition employed in Example 12 was replaced by the comparative ink composition No. 3 prepared in Comparative Example 3.

The reflectances of the ink images on the paper were measured in the same manner as in Example 12.

The results are shown in TABLE 6. TABLE 6 also shows the colors of the above-mentioned ink images according to visual observation.

TABLE 6

| | Reflectance of Image after Application of Voltage (Upper Electrode: Positive) | Reflectance of Image after Application of Voltage (Upper Electrode: Negative) | Color Perceived by Visual Observation (Upper Electrode: Positive/Negative) |
|---|---|---|---|
| Ex. 12 | 46.7 | 8.1 | White/Blue |
| Comp. Ex. 7 | 15.2 | 12.6 | Blue/Blue |

Japanese Patent Application No. 11-029238 filed Feb. 5, 1999, Japanese Patent Application No. 11-184710 filed Jun. 30, 1999, Japanese Patent Application No. 11-288276 filed Oct. 8, 1999, and Japanese Patent Application No. 2000-026043 filed Feb. 3, 2000 are hereby incorporated by reference.

What is claimed is:

1. A marking ink composition comprising:
   a dye,
   a pigment,
   a dispersion medium X in which said dye is practically soluble, and
   a dispersion medium Y in which said dye is practically insoluble, said dispersion medium X and said dispersion medium Y being mutually immiscible,
   wherein an affinity of said dispersion medium X for said pigment is smaller than an affinity of said dispersion medium Y for said pigment.

2. The marking ink composition as claimed in claim 1, wherein said dye exhibits a solubility of 0.1 wt % or less in said dispersion medium Y.

3. A marking ink composition comprising:
   a dye,
   a pigment,
   a dispersion medium X in which said dye is practically soluble, and
   a dispersion medium Y in which said dye is practically insoluble, said dispersion medium X and said dispersion medium Y being mutually immiscible,
   wherein said pigment comprises a hydrophobic portion or a non-polar portion at a surface of said pigment.

4. The marking ink composition as claimed in claim 3, wherein said hydrophobic portion or said non-polar portion is in the form of a layer which is provided by coating, chemical adsorption, or physical adsorption.

5. The marking ink composition as claimed in claim 1, wherein said pigment comprises a magnetic powder.

6. A marking ink composition comprising:
   a dye,
   a pigment,
   a dispersion medium X in which said dye is practically soluble, and
   a dispersion medium Y in which said dye is practically insoluble, said dispersion medium X and said dispersion medium Y being mutually immiscible,
   wherein said pigment comprises an electrophoretic migration powder.

7. The marking ink composition as claimed in claim 6, wherein said electrophoretic migration powder comprises a magnetic portion.

8. A marking ink composition comprising:
   a dye,
   a pigment,
   a dispersion medium X in which said dye is practically soluble, and
   a dispersion medium Y in which said dye is practically insoluble, said dispersion medium X and said dispersion medium Y being mutually immiscible,
   further comprising a dispersion medium Z, said dispersion medium Z, said dispersion medium X, and said dispersion medium Y being mutually immiscible.

9. A printing ink comprising a marking ink composition which comprises:
   a dye,
   a pigment,
   a dispersion medium X in which said dye is practically soluble, and
   a dispersion medium Y in which said dye is practically insoluble, said dispersion medium X and said dispersion medium Y being mutually immiscible,
   wherein an affinity of said dispersion medium X for said pigment is smaller than an affinity of said dispersion medium Y for said pigment.

10. The printing ink as claimed in claim 9, wherein said dye exhibits a solubility of 0.1 wt % or less in said dispersion medium Y.

11. A printing ink comprising a marking ink composition which comprises:
    a dye,
    a pigment,
    a dispersion medium X in which said dye is practically soluble, and
    a dispersion medium Y in which said dye is practically insoluble, said dispersion medium X and said dispersion medium Y being mutually immiscible,
    wherein said pigment comprises a hydrophobic portion or a non-polar portion at a surface of said pigment.

12. The printing ink as claimed in claim 11, wherein said hydrophobic portion or said non-polar portion is in the form of a layer which is provided by coating, chemical adsorption, or physical adsorption.

13. The printing ink as claimed in claim 9, wherein said pigment comprises a magnetic powder.

14. A printing ink comprising a marking ink composition which comprises:
- a dye,
- a pigment,
- a dispersion medium X in which said dye is practically soluble, and
- a dispersion medium Y in which said dye is practically insoluble, said dispersion medium X and said dispersion medium Y being mutually immiscible, wherein said pigment comprises an electrophoretic migration powder.

15. The printing ink as claimed in claim 14, wherein said electrophoretic migration powder comprises a magnetic portion.

16. A printing ink comprising a marking ink composition which comprises:
- a dye,
- a pigment,
- a dispersion medium X in which said dye is practically soluble, and
- a dispersion medium Y in which said dye is practically insoluble, said dispersion medium X and said dispersion medium Y being mutually immiscible, further comprising a dispersion medium Z, said dispersion medium Z, said dispersion medium X, and said dispersion medium Y being mutually immiscible.

17. A jet printing ink comprising a marking ink composition which comprises:
- a dye,
- a pigment,
- a dispersion medium X in which said dye is practically soluble, and
- a dispersion medium Y in which said dye is practically insoluble, said dispersion medium X and said dispersion medium Y being mutually immiscible, wherein an affinity of said dispersion medium X for said pigment is smaller than an affinity of said dispersion medium Y for said pigment.

18. The jet printing ink as claimed in claim 17, wherein said dye exhibits a solubility of 0.1 wt % or less in said dispersion medium Y.

19. A jet printing ink comprising a marking ink composition which comprises:
- a dye,
- a pigment,
- a dispersion medium X in which said dye is practically soluble, and
- a dispersion medium Y in which said dye is practically insoluble, said dispersion medium X and said dispersion medium Y being mutually immiscible, wherein said pigment comprises a hydrophobic portion or a non-polar portion at a surface of said pigment.

20. The jet printing ink as claimed in claim 18, wherein said hydrophobic portion or said non-polar portion is in the form of a layer which is provided by coating, chemical adsorption, or physical adsorption.

21. The jet printing ink as claimed in claim 17, wherein said pigment comprises a magnetic powder.

22. A jet printing ink comprising a marking ink composition which comprises:
- a dye,
- a pigment,
- a dispersion medium X in which said dye is practically soluble, and
- a dispersion medium Y in which said dye is practically insoluble, said dispersion medium X and said dispersion medium Y being mutually immiscible, wherein said pigment comprises an electrophoretic migration powder.

23. The jet printing ink as claimed in claim 22, wherein said electrophoretic migration powder comprises a magnetic portion.

24. A jet printing ink comprising a marking ink composition which comprises:
- a dye,
- a pigment,
- a dispersion medium X in which said dye is practically soluble, and
- a dispersion medium Y in which said dye is practically insoluble, said dispersion medium X and said dispersion medium Y being mutually immiscible, further comprising a dispersion medium Z, said dispersion medium Z, said dispersion medium X, and said dispersion medium Y being mutually immiscible.

* * * * *